(12) United States Patent
Niven

(10) Patent No.: US 8,186,246 B2
(45) Date of Patent: May 29, 2012

(54) GRIPPING OR CLAMPING MECHANISMS

(75) Inventor: David Niven, Merrilands (NZ)

(73) Assignee: Weatherford/Lamb, Inc., Houston, TX (US)

( * ) Notice: Subject to any disclaimer, the term of this patent is extended or adjusted under 35 U.S.C. 154(b) by 1215 days.

(21) Appl. No.: 11/088,412

(22) Filed: Mar. 24, 2005

(65) Prior Publication Data

US 2005/0160881 A1    Jul. 28, 2005

Related U.S. Application Data

(63) Continuation of application No. 10/099,087, filed on Mar. 15, 2002, now abandoned, which is a continuation of application No. PCT/NZ00/00181, filed on Sep. 15, 2000.

(30) Foreign Application Priority Data

Sep. 17, 1999  (NZ) .......................................... 337898
Dec. 4, 2001  (NZ) .......................................... 515919

(51) Int. Cl.
*B25B 13/46*    (2006.01)

(52) U.S. Cl. ...... 81/57.16; 81/59.1; 81/57.34; 81/57.36; 192/44; 192/47; 188/82.84; 166/77.51; 166/77.53; 269/236

(58) Field of Classification Search ................. 81/57.37, 81/57.36, 90.3, 90.6, 57.39, 40.3, 59.1, 57.16, 81/57.21, 57.34; 175/203; 192/44, 45, 47; 188/67, 82.84, 83, 82.74; 279/9.1, 102, 103, 279/903; 166/77.51, 77.53, 85.1; 269/266, 269/229, 236

See application file for complete search history.

(56) References Cited

U.S. PATENT DOCUMENTS

| 1,031,637 | A |   | 7/1912 | Fischer |
|---|---|---|---|---|
| 3,662,867 | A |   | 5/1972 | Kinzbach |
| 3,748,702 | A |   | 7/1973 | Brown |
| 3,902,384 | A | * | 9/1975 | Ehrler ............................ 81/445 |
| 3,942,616 | A |   | 3/1976 | Elmore |

(Continued)

FOREIGN PATENT DOCUMENTS

AU    40496/85    3/1985

(Continued)

OTHER PUBLICATIONS

PCT Search Report, International Application No. PCT/NZ00/00181, dated Dec. 13, 2000.

(Continued)

*Primary Examiner* — D. S. Meislin
(74) *Attorney, Agent, or Firm* — Patterson & Sheridan, L.L.P.

(57) ABSTRACT

A clamping mechanism having two or more jaws which may be opened to allow a tubular to be introduced within the jaws and closed to retain the tubular therewithin. The rollers are located within concave recesses and maintained in spaced apart relationship by biasing means, whereby rotation of tubular may cause the rollers to be wedged between a wall of the recess and the tubular to grip the tubular within the jaws. The clamping mechanism may be utilized as an oil field tubular clamp, a slip, a pipe clamp, and other mechanisms. There is also disclosed a clutch comprising an outer race, a cage, and an inner ring. Recesses are provided in an outer race and accommodate rollers therewith and maintained in spaced apart relationship by the cage. The cage may be moved by an actuator to selectively allow free wheeling or prevent rotation. A socket ratchet incorporating such a clutch is also disclosed.

12 Claims, 38 Drawing Sheets

U.S. PATENT DOCUMENTS

| | | | |
|---|---|---|---|
| 3,993,177 A | | 11/1976 | Gehrke |
| 4,023,449 A | * | 5/1977 | Boyadjieff ................ 81/57.16 |
| 4,084,453 A | | 4/1978 | Eckel |
| 4,116,015 A | | 9/1978 | Duncan |
| 4,212,212 A | | 7/1980 | Chandler et al. |
| 4,221,269 A | | 9/1980 | Hudson |
| 4,372,026 A | * | 2/1983 | Mosing ...................... 29/426.5 |
| 4,446,761 A | | 5/1984 | Boyadjieff et al. |
| 4,531,620 A | | 7/1985 | Stone |
| 4,585,079 A | | 4/1986 | Lemaire et al. |
| 4,823,653 A | * | 4/1989 | Batten ........................... 81/468 |
| 4,827,808 A | | 5/1989 | Haynes et al. |
| 4,848,469 A | * | 7/1989 | Baugh et al. ................. 166/382 |
| 4,979,356 A | | 12/1990 | Vatne |
| 5,103,950 A | | 4/1992 | Ito et al. |
| 5,390,573 A | | 2/1995 | Mann |
| 5,535,647 A | * | 7/1996 | Donaldson, Jr. ............... 81/59.1 |
| 5,542,318 A | | 8/1996 | Wesch, Jr. |
| 5,596,913 A | * | 1/1997 | Matsubara et al. ............ 81/59.1 |
| 5,676,226 A | | 10/1997 | Lampela et al. |
| 5,845,549 A | | 12/1998 | Bouligny |
| 5,937,981 A | | 8/1999 | Adams et al. |
| 5,967,477 A | | 10/1999 | Walmsley |
| 6,253,845 B1 | | 7/2001 | Belik |
| 6,305,649 B1 | * | 10/2001 | Walmsley et al. ............... 248/49 |
| 6,311,789 B1 | | 11/2001 | Saxman |
| 6,318,141 B1 | * | 11/2001 | Tokunaga ........................ 72/164 |
| 6,327,938 B1 | * | 12/2001 | Pietras ......................... 81/57.33 |
| 6,651,476 B2 | * | 11/2003 | Nordlof ........................... 72/164 |
| 6,675,836 B1 | | 1/2004 | Gaston et al. |
| 7,017,919 B2 | * | 3/2006 | Matsumoto et al. ........... 279/9.1 |
| 7,147,254 B2 | * | 12/2006 | Niven et al. ................... 285/411 |
| 7,181,998 B2 | * | 2/2007 | Matsumoto et al. ........... 81/59.1 |

FOREIGN PATENT DOCUMENTS

| | | |
|---|---|---|
| DE | 67806 | 3/1893 |
| DE | 3321358 | 12/1984 |
| DE | 3508739 | 9/1986 |
| EP | 0 111 191 | 6/1984 |
| EP | 0156575 | 10/1985 |
| WO | WO 94/01249 | 1/1994 |
| WO | WO 01/21933 | 3/2001 |
| WO | WO 01/21933 A1 * | 3/2001 |
| WO | WO 01/81046 | 11/2001 |

OTHER PUBLICATIONS

EP Office Action dated Feb. 23, 2011, European Patent Application No. 00963175.5.

EP Extended European Search dated Feb. 28, 2011, European Patent Application No. 10180299.9.

* cited by examiner

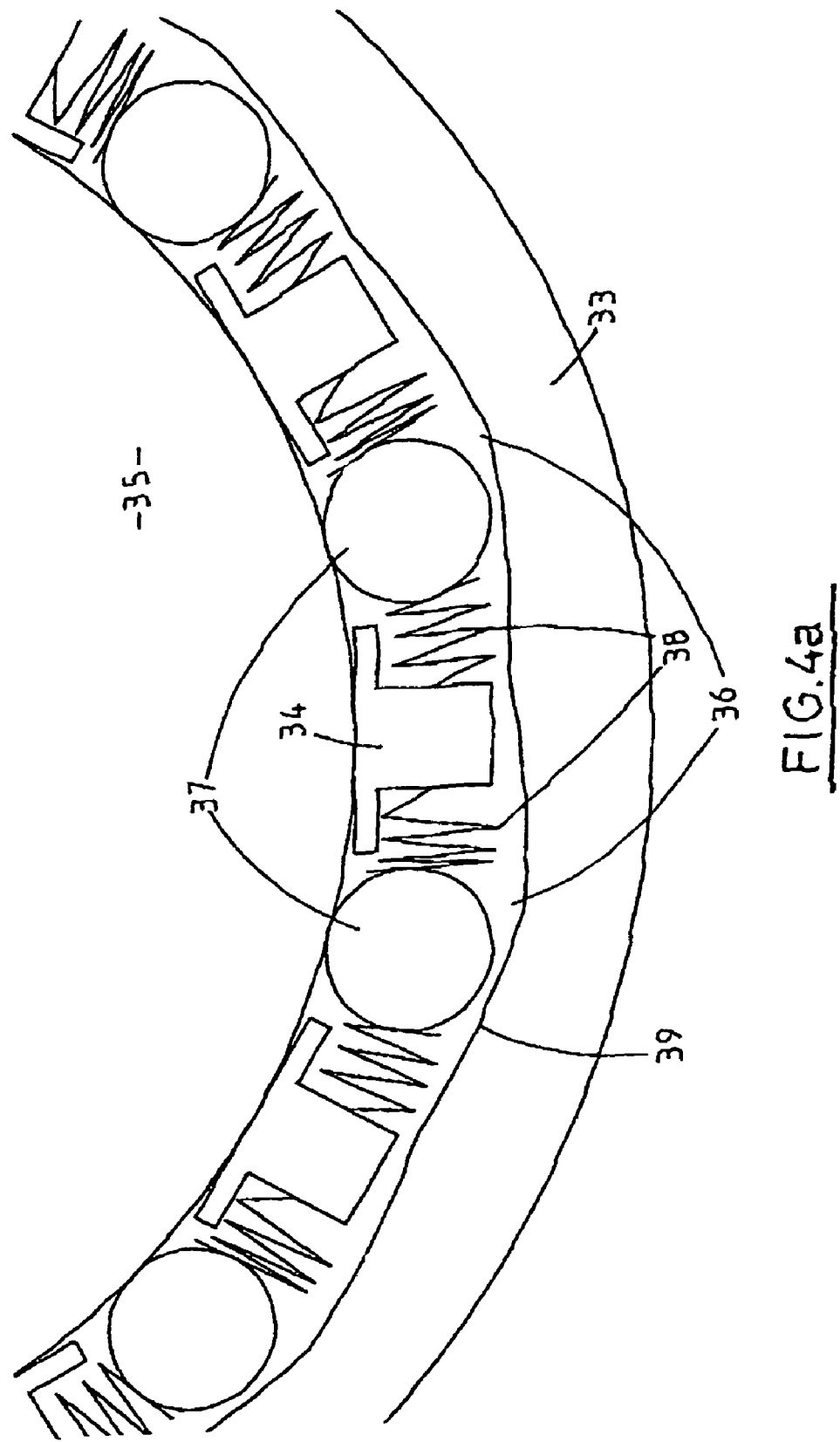

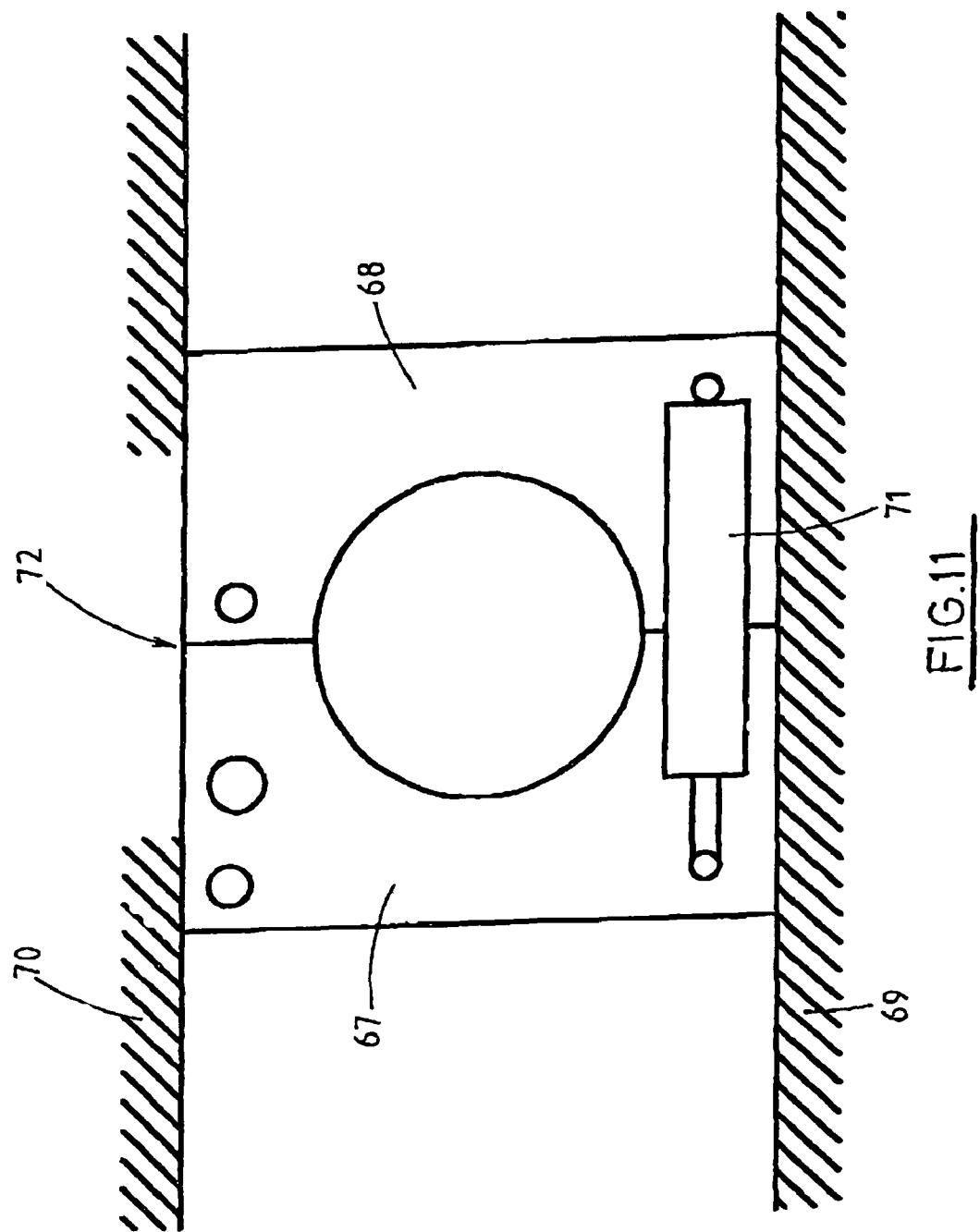

"Prior Art"

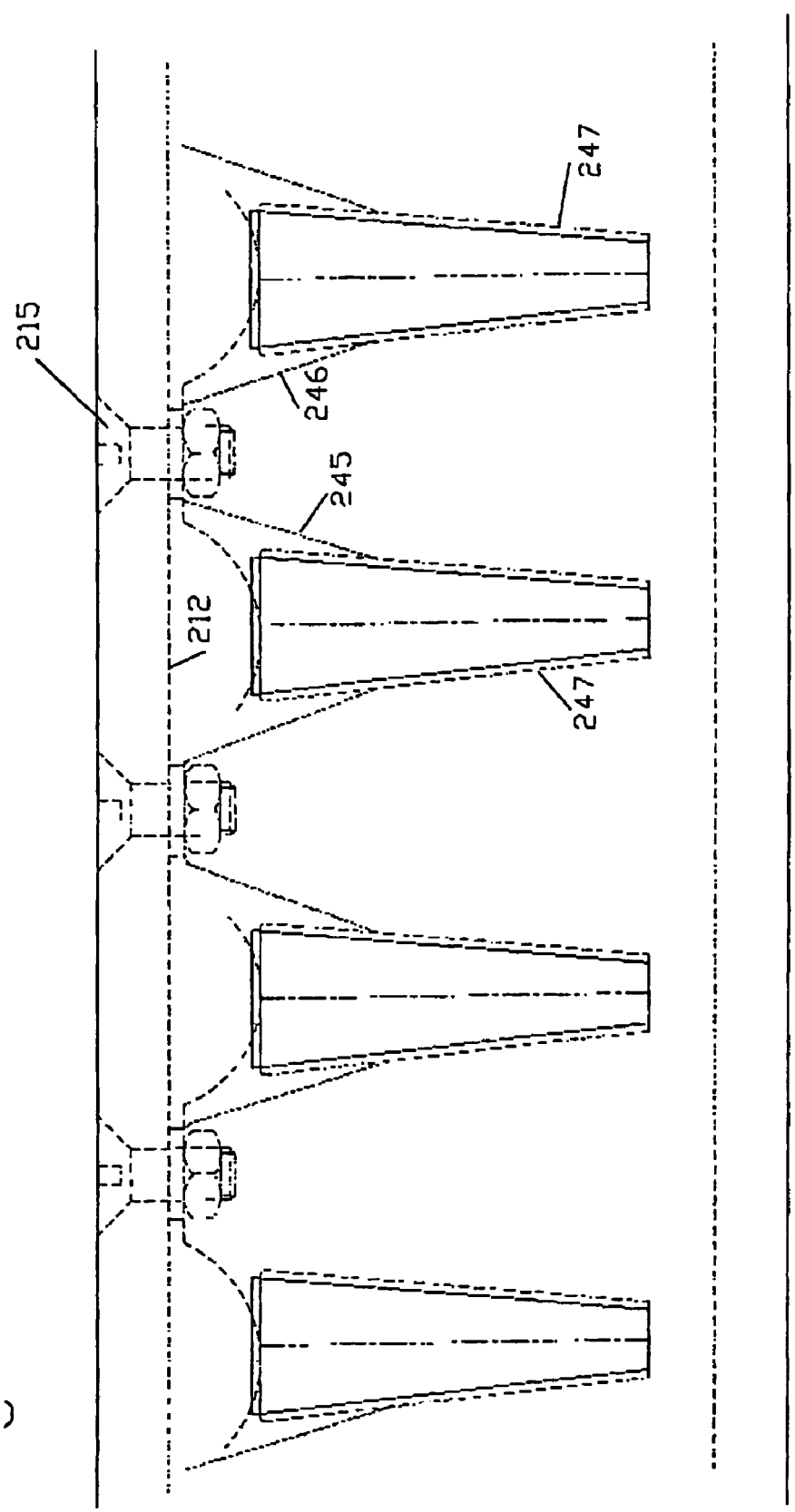

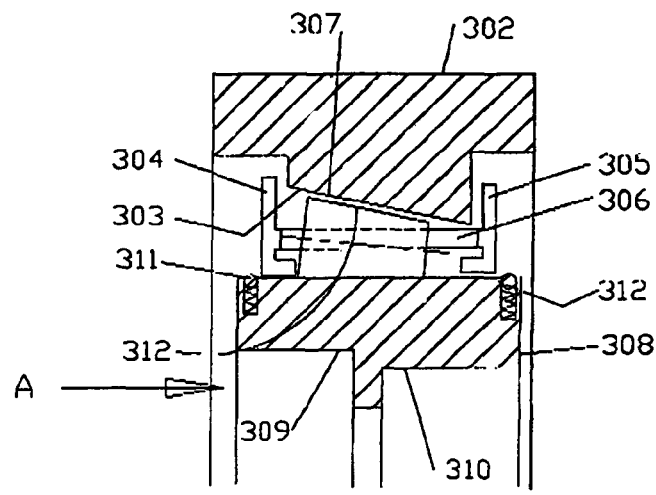
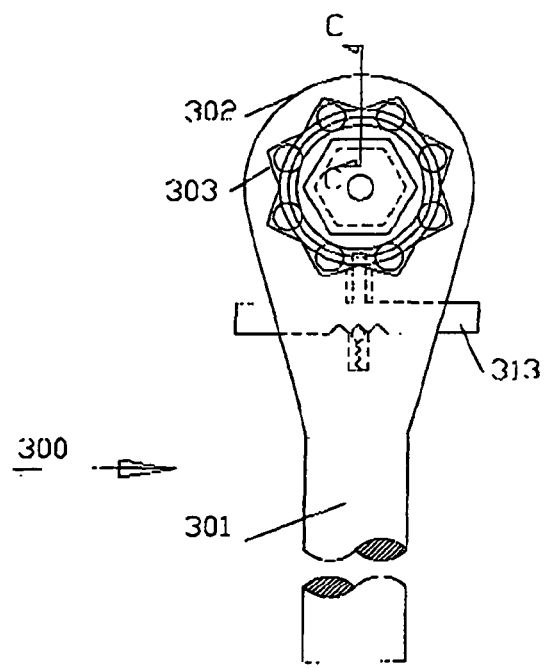
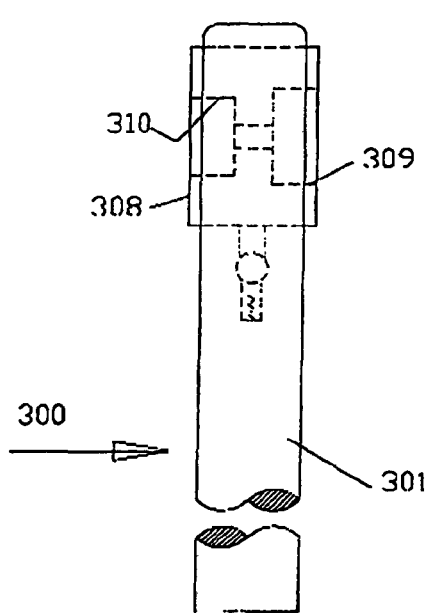
Fig. 31c
FIG.31a
FIG.31b

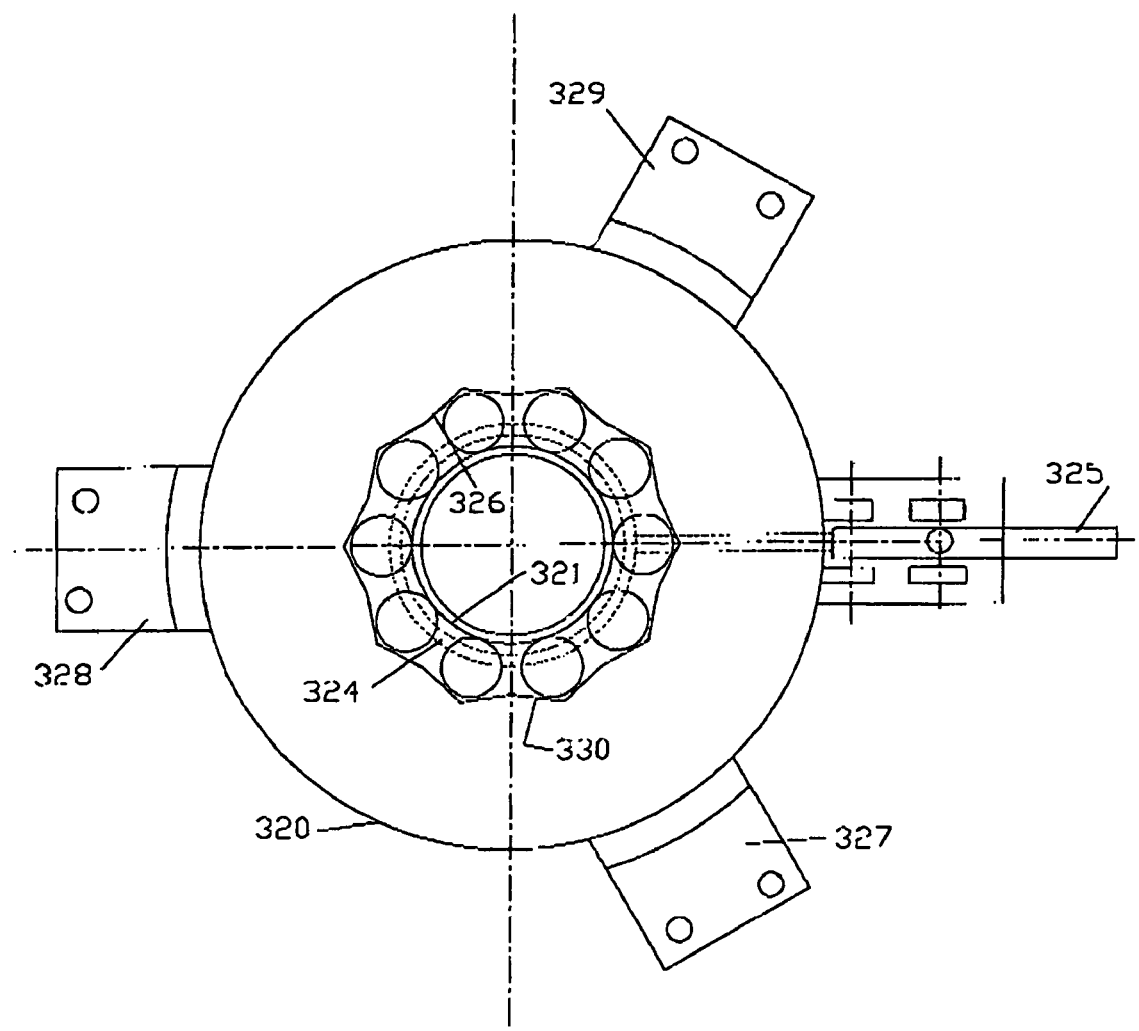

GRIPPING OR CLAMPING MECHANISMS

CROSS-REFERENCE TO RELATED APPLICATIONS

This application is a continuation of U.S. patent application Ser. No. 10/099,087, filed Mar. 15, 2002, now abandoned, which was a continuation of PCT patent application No. PCT/NZ00/00181, filed Sep. 15, 2000, which claims the benefit of New Zealand patent application serial number 337898, filed Sep. 17, 1999 and which claims the benefit of New Zealand patent application serial number 515919, filed Dec. 4, 2001. Each of the aforementioned related patent applications is herein incorporated by reference.

THE TECHNICAL FIELD

This invention relates to gripping or clamping mechanisms, typically (although not exclusively) for use in the oil field industry.

BACKGROUND OF THE INVENTION

The sprague clutch is commonly employed as a one-directional clutch, for example in vehicle transmissions. FIG. 18 shows a prior art type sprague clutch. A tubular body 100 has a plurality of axial recesses 101 formed therein to define a plurality of circumferential ramp surfaces 102. Rollers 103 are located within recesses 101 and maintained in a biased position by springs 104. Rollers 103 contact and engage a ground inner ring 105.

When inner ring 105 is rotated clockwise with respect to body 100 rollers 103 are urged by inner ring 105 in a clockwise direction. Due to inclined ramp surfaces 102 rollers 103 become wedged between ramp surfaces 102 and inner ring 105. Clockwise rotational force is therefore transferred between outer race 100 and inner ring 105 through rollers 103. When inner ring 105 is rotated anticlockwise with respect to outer race 100 rollers 103 move anticlockwise with respect to outer race 100. This frees the rollers and inner ring 105 is able to rotate relatively freely with respect to outer race 100.

A modified design is shown in U.S. Pat. No. 5,103,950 in which roller recesses having a double cam-profile are utilized. Rollers 30 are also located within a cage 40. The double earn profile 21 enables the clutch to work in either direction. When shaft 10 and outer race 20 are wedged together by rollers 30, cage 40 is driven via shaft 10 and rollers 30. Power is thus transferred via shaft 10, rollers 30 and cage 40. This clutch arrangement works automatically so that relative rotation of shaft 10 in outer race 20 causes rollers 30 to lock them together and cage 40 is driven thereby.

During tubular running operations or well operations it is necessary to grip an oil field tubular, such as a drill string, to hold one section whilst another section is rotated relative thereto to assemble or disassemble a string. A number of automated devices for handling drill pipes are known such as disclosed in U.S. Pat. No. 4,585,079.

Standard oil field tubulars are relatively robust and prior art clamping mechanisms have included toothed jaws or other means which apply a high force to a relatively small area of the tubular. As standard drill string is formed of relatively uniform steel this does not pose a major problem. However, some modern drill strings are formed of special materials, such as high alloy steel pipe (e.g. 13 Cr), and handling by conventional clamping mechanisms can damage them. Such damage may reduce the life of the drill string and reduce the advantage gained from any surface coating or treatment.

For example, conventional methods of gripping a downhole tubular are described in U.S. Pat. No. 5,845,549 and U.S. Pat. No. 4,084,453. Gripping members with sharp teeth are forced into engagement with the tubular. A problem with this method is that the teeth cause permanent deformation of the tubular. In certain circumstances this can present serious problems. For instance, in a sour gas well, corrosive gases such as Hydrogen Sulphide and Carbon Dioxide will be present. If the tubular is formed with a material such as Chromium, these gases will corrode the tubular more quickly if the tubular has a rough deformed surface.

The situation is problematic as the clamping mechanisms must restrain oil field tubulars against high torques (up to 300,000 foot pounds) in a dirty and greasy environment. Further, the tubulars may vary in diameter, ovality, wall thickness, material etc. The tubulars may also be dented, rusty or have surface scale.

A number of tools include ratchet mechanisms to allow free rotation in only one selected direction. Such tools include wrenches for socket sets, screw drivers, braces etc. In some situations, especially with wrenches, there is very limited space to move a tool. In some cases the ratchet steps may be so coarse that it is not possible to move between one ratchet position to the next. This may make it impossible to use a tool in a confined space.

Pipe clamps typically include jaws which grip a pipe to be retained. As with oil field tubulars this may result in marking of the pipe. It would be desirable to provide a pipe clamp which is able to resist high rotational forces without damaging the pipe.

DISCLOSURE OF THE INVENTION

It is an object of the invention to provide an improved gripping or clamping mechanism or to at least provide the public with a useful choice.

According to a first aspect of the invention there is provided a clamping mechanism including:
  a plurality of jaws which may be moved apart to allow an object to be positioned within the jaws and moved together to substantially encompass the object; and
  a plurality of rollers retained about the mouths of the jaws between the jaws and the object, the arrangement being such that when the jaws are closed about an object rotation of the rollers against the object enclosed within the jaws may cause the rollers to move into positions in which they are wedged between the jaws and the object so that the object is gripped by the clamping mechanism.

The rollers are preferably retained by positioning means which allow the rollers to be rotated with respect to the jaws to bring the rollers into a position in which they may be wedged between the jaws and an object to be gripped. The positioning means is preferably a cage formed in sections corresponding to the jaw sections.

The rollers may locate within ramped recesses formed in the jaws. For rotational gripping the rollers will be axially aligned and for longitudinal gripping the rollers will be transversely aligned. The recesses containing the rollers may have a ramp in only one direction or ramps in both directions to facilitate gripping for both directions of rotation.

Alternatively, the rollers may be asymmetric elements known as "dog bones". Where dog bones are employed the inner jaw surface and object to be gripped may have a substantially circular cross-section.

The jaws may be formed in two or more parts. They may be hingedly connected or translated into and out of their closed configuration. The jaw sections may interengage at their edges and include means to lock the jaw sections together. A split pin arrangement through overlapping fingers may be employed.

Preferably, positioning means retains the rollers in spaced apart relation about the jaws wherein the positioning means may selectively rotate the gripping elements with respect to the jaws so as to cause the rollers to become wedged between the jaws and a gripped element.

The positioning means is preferably a cage to which the rollers are mounted and which may be rotated with respect to the gripping surface. The rollers may co-operate with ramp surfaces formed in the gripping surface.

A second aspect of the invention provides gripping apparatus comprising a plurality of rollers which taper axially from a relatively narrow end to a relatively wide end; and a body having a cam surface which is shaped so as to urge the rollers against a gripped member, when in use, when the rollers translate axially with respect to the cam surface, and which is also shaped so as to urge the rollers against the gripped member when the rollers roll along the cam surface.

The use of tapered rollers provides a number of advantages compared to parallel-sided rollers. Firstly, the rollers can provide resistance to both axial and rotational forces. Secondly, the system is more flexible because the rollers can be engaged in two different ways (that is, by sliding axially or by rolling). Thirdly, the apparatus can accommodate different gripped members with a wider variety of sizes. Fourthly, the rollers can be more densely packed because a smaller amount of rolling movement needs to be accommodated. Fifthly, axial engagement of the rollers can be achieved more easily using a linear drive device such as a hydraulic or pneumatic cylinder.

Preferably the apparatus further comprises an actuator for generating relative axial and/or rolling movement between the rollers and the cam surface to urge the rollers against the gripped member.

The actuator may engage the rollers and/or the cam surface. The cam surface or the rollers may remain stationary during the relative movement. In a preferred embodiment, the rollers are moved by a cage coupled to a hand operated lever. Alternatively, the actuator may include a hydraulic or pneumatic cylinder.

Preferably the actuator comprises a plurality of resilient members, such as leaf springs, each coupled with a respective roller. The resilient members can then flex by different amounts if one of the rollers becomes stuck.

The angle of taper of the rollers may vary, but preferably is approximately constant along the length of the rollers.

The rollers may have a non-circular (e.g. elliptical) cross-section but typically are substantially circular in cross-section.

Most preferably the rollers are substantially frustoconical.

In one embodiment all of the rollers taper in the same direction. In another embodiment the direction of taper of the rollers alternates between successive rollers. This 'top-and-tail' arrangement permits the rollers to be packed more densely.

Typically the cam surface is formed with a plurality of recesses, each recess receiving a respective roller.

The body may comprise a single fixed piece, or may comprise two or more jaws which can be opened to admit the gripped member.

A further aspect of the invention provides apparatus for gripping a downhole tubular comprising gripping apparatus according to the first or second aspect of the invention.

A further aspect of the invention provides a socket wrench comprising gripping apparatus according to the second aspect of the invention. This provides an alternative application for the apparatus. In this case, the gripped member is an integral part of the apparatus, and comprises one or more sockets, typically hexagonal shaped.

A further aspect of the invention provides a method of handling a downhole tubular comprising gripping the tubular with a plurality of gripping members arranged circumferentially around the pipe; and transferring rotational and/or longitudinal forces to or from the tubular, wherein the tubular is gripped in such a manner so as not to exceed the elastic deformation limit of the tubular while the forces are being transferred.

The advantage of this aspect of the invention is that it substantially avoids permanent deformation of the tubular.

Typically the method comprises urging the gripping members against the tubular by a wedging action. This wedging action tends to spread the gripping force over a relatively wide area, thus avoiding excessive deformation of the tubular.

Typically the gripping member comprises a roller. The roller may have a wide variety of shapes including cylindrical, frustoconical, spherical or asymmetric—for instance the 'dog bone' shape shown in FIG. 13 of WO 01/21933.

The gripping method may be employed during a variety of downhole operations. For example the tubular may be gripped while it is coupled (for instance by screwing) with an additional length of downhole tubular. Typically the maximum deformation of the tubular is greater than 10% and less than 100% of the elastic limit.

A further aspect of the invention provides a method of handling a downhole tubular comprising gripping the tubular with a plurality of rollers arranged circumferentially around the tubular; and transferring rotational and/or longitudinal forces to or from the tubular.

A further aspect of the invention provides apparatus for gripping a downhole tubular comprising a plurality of rollers; and a body having a cam surface which is shaped so as to urge the rollers against a downhole tubular, when in use, when the rollers roll along the cam surface.

The apparatus according to the various aspects of the invention is particularly suited to use in gripping or clamping a downhole tubular. The downhole tubular may be pipe casing, a drill string, or any other tubular associated with subterranean operations, typically in the oilfield industry.

For instance the apparatus may be of use in a power tong for gripping and rotating the downhole tubular, a backup for gripping and securing the downhole tubular against rotational movement, or in an elevator for securing the downhole tubular against axial and rotational movement.

BRIEF DESCRIPTION OF THE DRAWINGS

The invention will now be described by way of example with reference to the accompanying drawings in which:

FIG. 4a: shows a detailed cross-sectional view of a section of the clutch of FIG. 3.

FIG. 11: shows a ram actuated jaw arrangement utilizing a single ram.

FIG. 22c is a view of a further alternative cage.

FIG. 27b is a section along line B-B in FIG. 27a.

FIG. 31a is a front view of a hand held socket wrench.

FIG. 31b is a side view of the wrench of FIG. 31a.

FIG. 31c is a cross-section taken along line C-C in FIG. 31a.

FIG. 33 is a plan view of the elevator of FIG. 33.

BEST MODE FOR CARRYING OUT THE INVENTION

Figure 1:
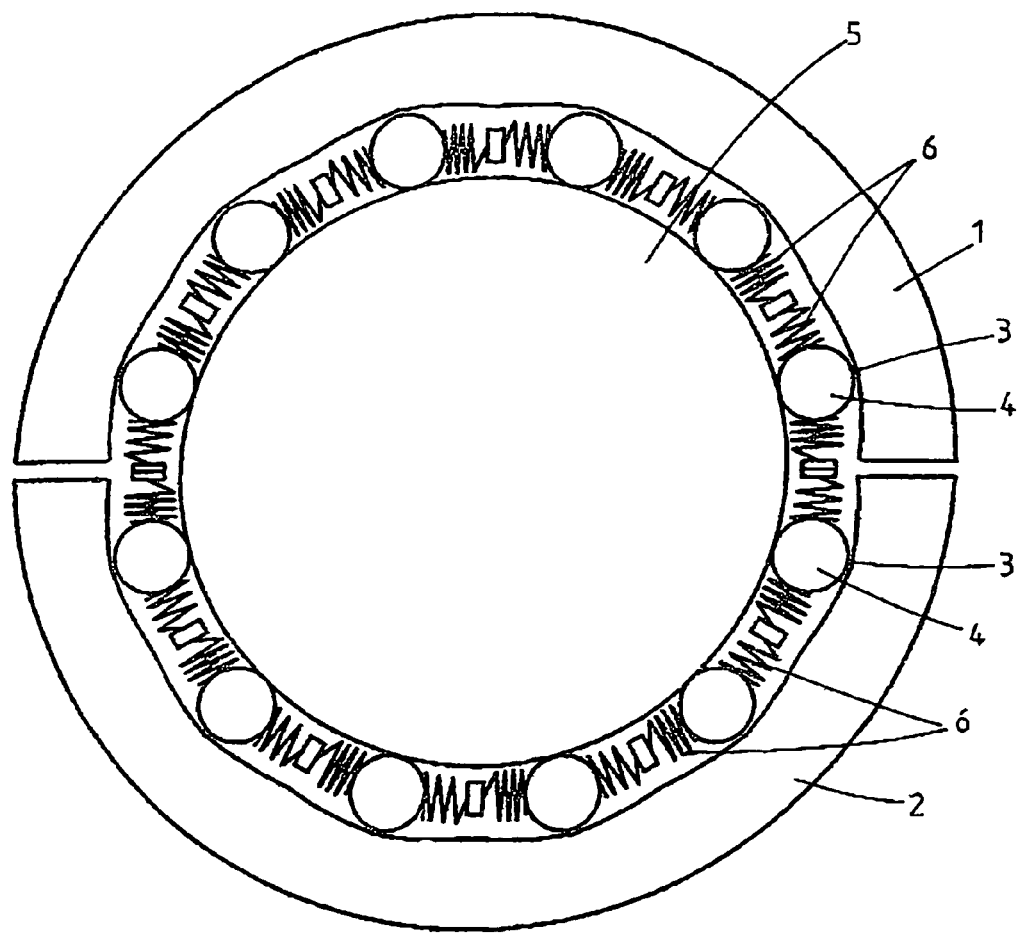
FIG. 1: shows a conceptual view of a clamping mechanism of the invention.
Figure 2:
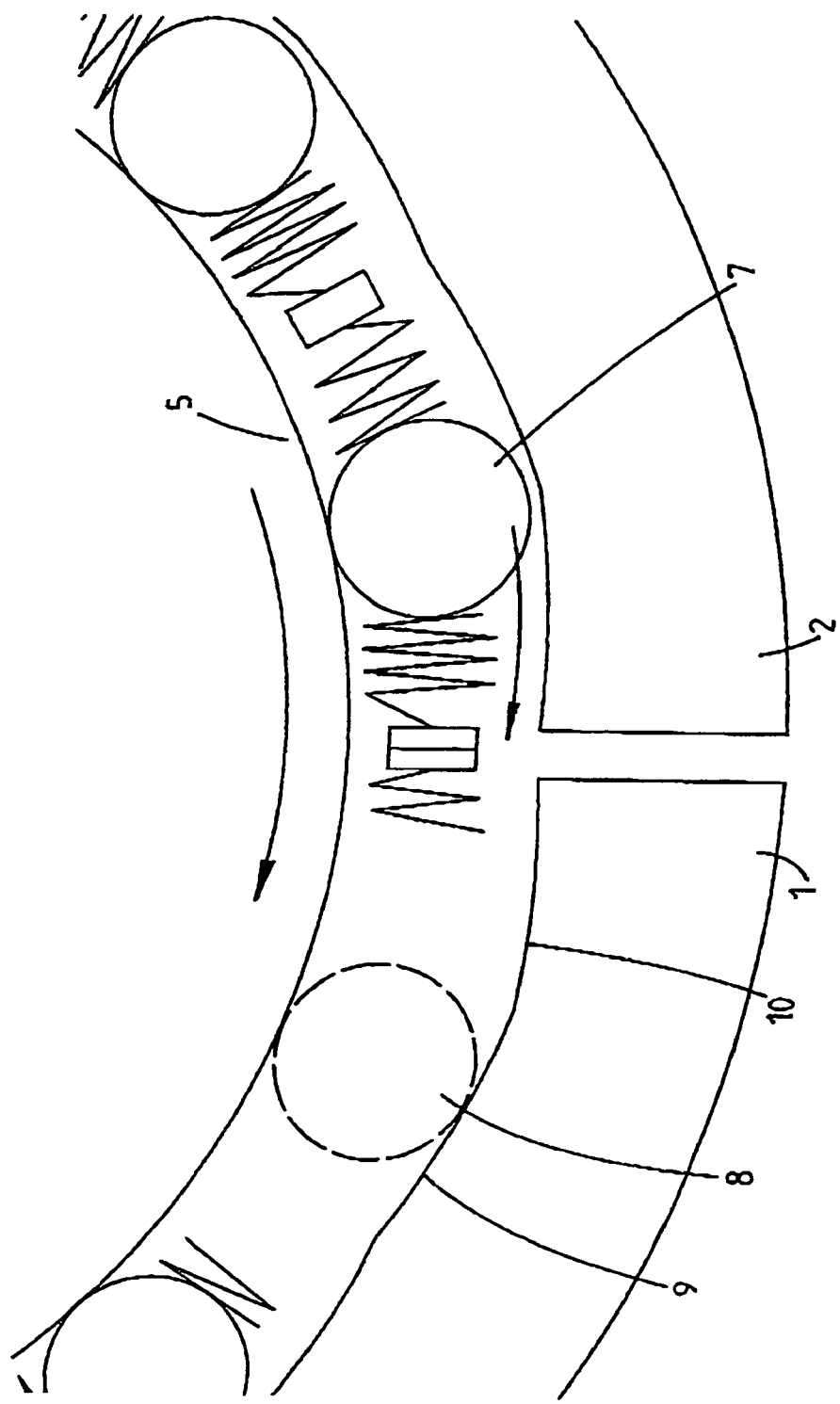
FIG. 2: shows a detailed view of a section of the clamping mechanism shown in FIG. 1.

FIGS. 1 and 2 illustrate the concept of the clamping mechanism of the invention. Jaws 1 and 2 are provided with wedge shaped recesses 3 having rollers 4 positioned therein. Jaws 1 and 2 may be moved apart so that a tubular member 5 may be moved laterally into the jaws. Jaws 1 and 2 may be pivotally connected together at one end to enable the jaws to open and close or the jaws may be translated apart and forced back together. Although two jaws are shown in FIG. 1 it will be appreciated that 3 or more jaw segments could be used.

Rollers 4 are biased apart by springs 6. When jaws 1 and 2 are closed around a tubular member 5, as shown in FIG. 1, rollers 4 are initially located at the apex of recess 3 (see roller 7 in FIG. 2). When the tubular member 5 is rotated rollers 4 are urged by tubular member 5 in the direction of rotation of tubular 5.

The dashed roller 8 in FIG. 2 illustrates the position adopted by the roller when urged to the left by rotation of tubular member 5. It will be seen that roller 8 becomes wedged between ramp face 9 and tubular member 5. All of the rollers 4 are likewise wedged as tubular member 5 is rotated and this causes tubular member 5 to be restrained from rotation within the clamping mechanism.

It will be apparent that rotation in the opposite direction will cause roller 8 to be wedged between opposite ramp surface 10 and tubular member 5. The clamping mechanism can thus restrain rotation of tubular member 5 in both directions.

For a relatively smooth tubular member 5 the above mechanism may be satisfactorily. If rollers 4 are biased towards tubular member 5 by springs 6 then rotation of tubular member 5 will move rollers 4 relatively consistently into their wedged positions. Where the surface of the tubular 5 is uneven it is desirable to move the rollers so that each roller is wedged between the jaws 1 and 2 and the tubular 5.

A number of positioning means could be used to position the rollers ranging from cages through to magnetic retention means.

Figure 3:
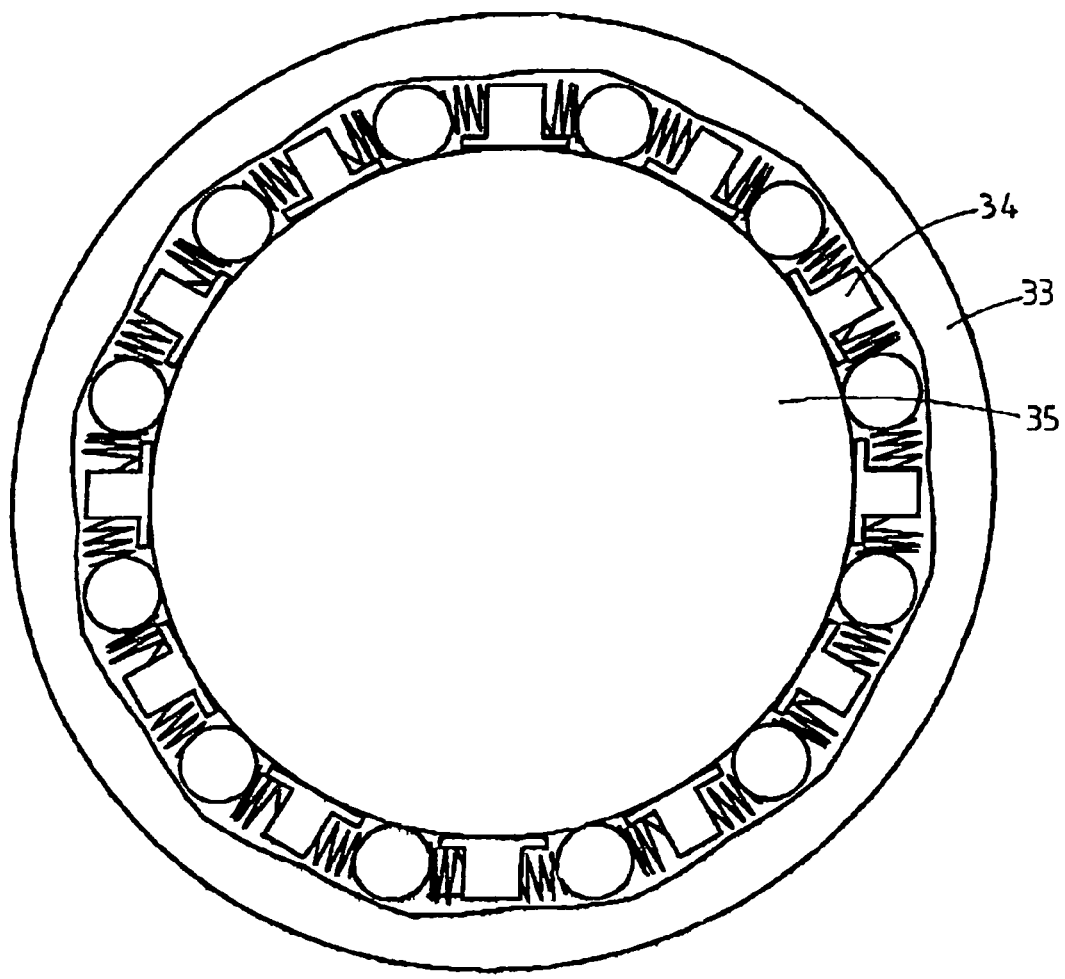
FIG. 3: shows a plan view of the main sections of a clutch connected to a shaft.

In FIGS. 3 and 4a a clutch mechanism utilizing this principle will be described. The clutch consists of an outer race 33, a cage 34, and an inner ring 35. A plurality of wedge shaped axial recesses 36 are formed in outer race 33. Rollers 37 are accommodated in recesses 36. Rollers 37 are biased by springs 38 between sections of cage 34. Cage 34 is rotatable relative to outer race 33. In a "neutral" position cage 34 is positioned with respect to outer race 33 so that rollers 37 are positioned adjacent the apexes of recesses 36. In this position rollers 37 are biased by springs 38 towards the apex of recesses 36 and so do not become wedged between ramp surfaces 39 and inner ring 35. This allows inner ring 35 to rotate freely in either direction with respect to outer race 33.

When the cage is rotated clockwise with respect to outer race 33 rollers 37 are urged by springs 38 in a clockwise direction so that they become wedged between ramp surface 39 and inner ring 35. In this position inner ring 35 is restricted from clockwise rotation relative to outer race 33. Due to the double wedge profile of the recesses 36 it will be appreciated that relative rotation of ring 35 in the anticlockwise direction can be restrained by anticlockwise rotation of cage 34 with respect to outer race 33 to position rollers 37 adjacent the opposite ramp surfaces.

This arrangement has the advantage that the clutch may be selectively operated. It also allows the clutch to operate in a free wheeling mode whilst selectively restraining rotation in either direction.

Figure 4B:
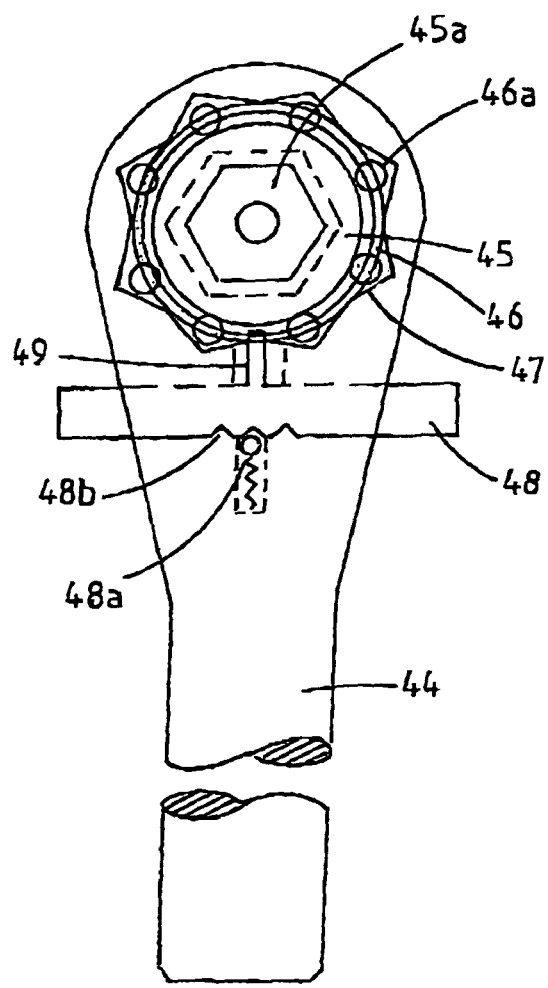
FIG. 4b: shows a plan view of socket set handle incorporating a clutch mechanism according to the invention.
Figure 4C:
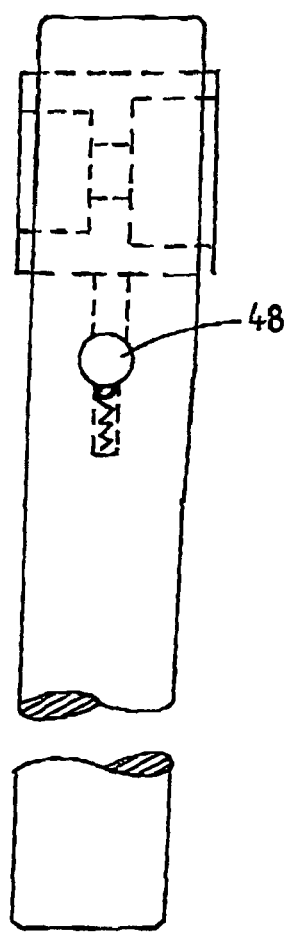
FIG. 4c: shows a side view of the socket set handle shown in FIG. 4b.

Referring now to FIGS. 4b and 4c a socket set handle incorporating the above clutch mechanism will be described. Socket handle 44 is equivalent to outer race. 33 shown in FIG. 4a. Cage 46 has a plurality of rollers 46a which engage within recesses 47. Inner race 45 has a hexagonal socket engaging portion 45a.

Actuator 48 has a pin 49 which engages with cage 46. Actuator 48 is shown in its neutral position but can be moved to the left or right so that pin 49 moves cage 46 to the left or right so that the clutch mechanism can be adjusted to prevent relative rotation of inner race 45 with respect to handle 44 in either direction. A spring loaded ball 48a engages with notches 48b to retain cage actuator 48 in the desired position.

It will be appreciated that this arrangement enables a socket tool to be used in very confined spaces due to the minimal handle rotation required to produce rotation of bolt head 45a.

Figure 5:
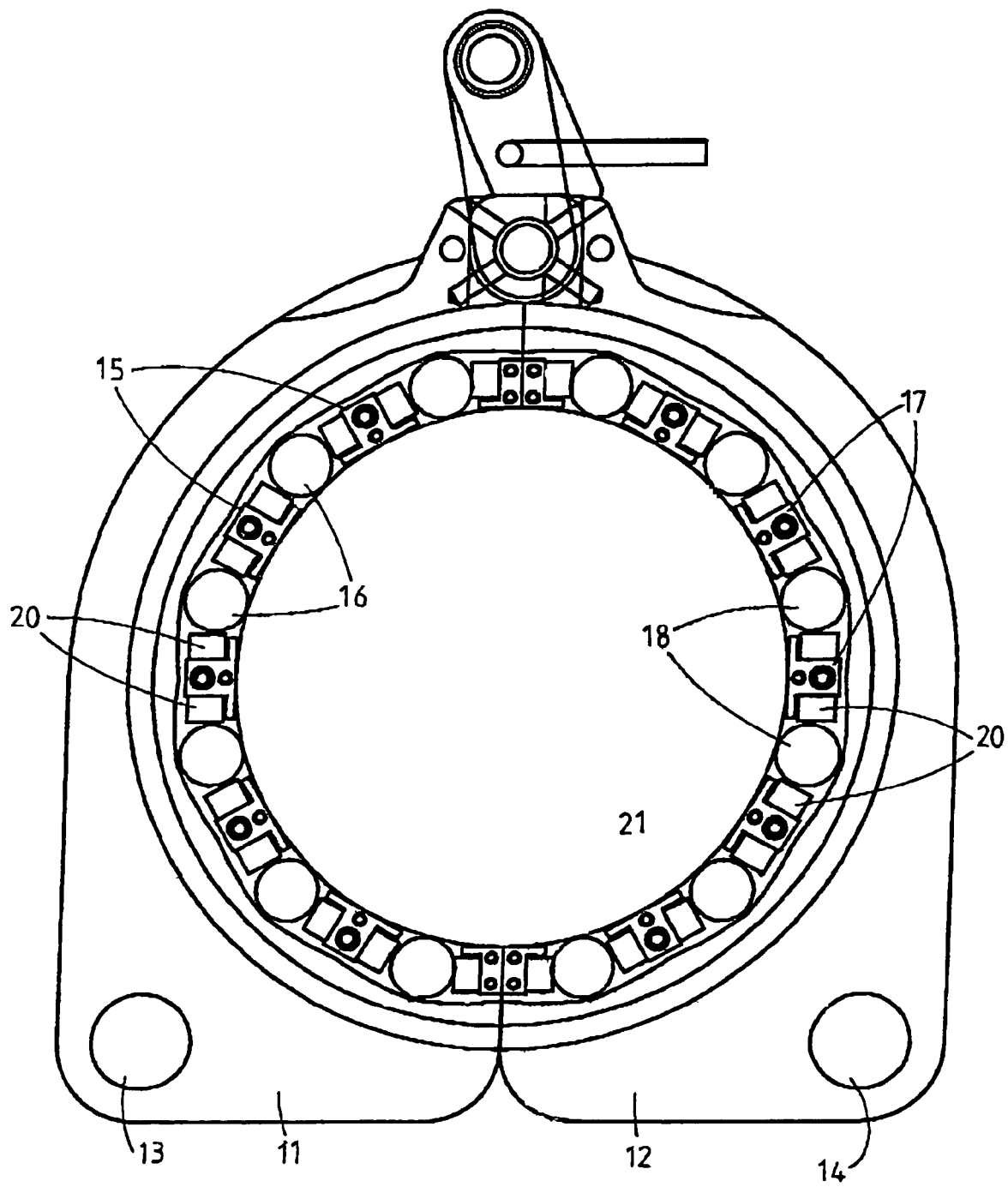
FIG. 5: shows a cross-sectional view of a clamping mechanism suitable for use in a machine for rand ling oil field tubulars.
Figure 6:
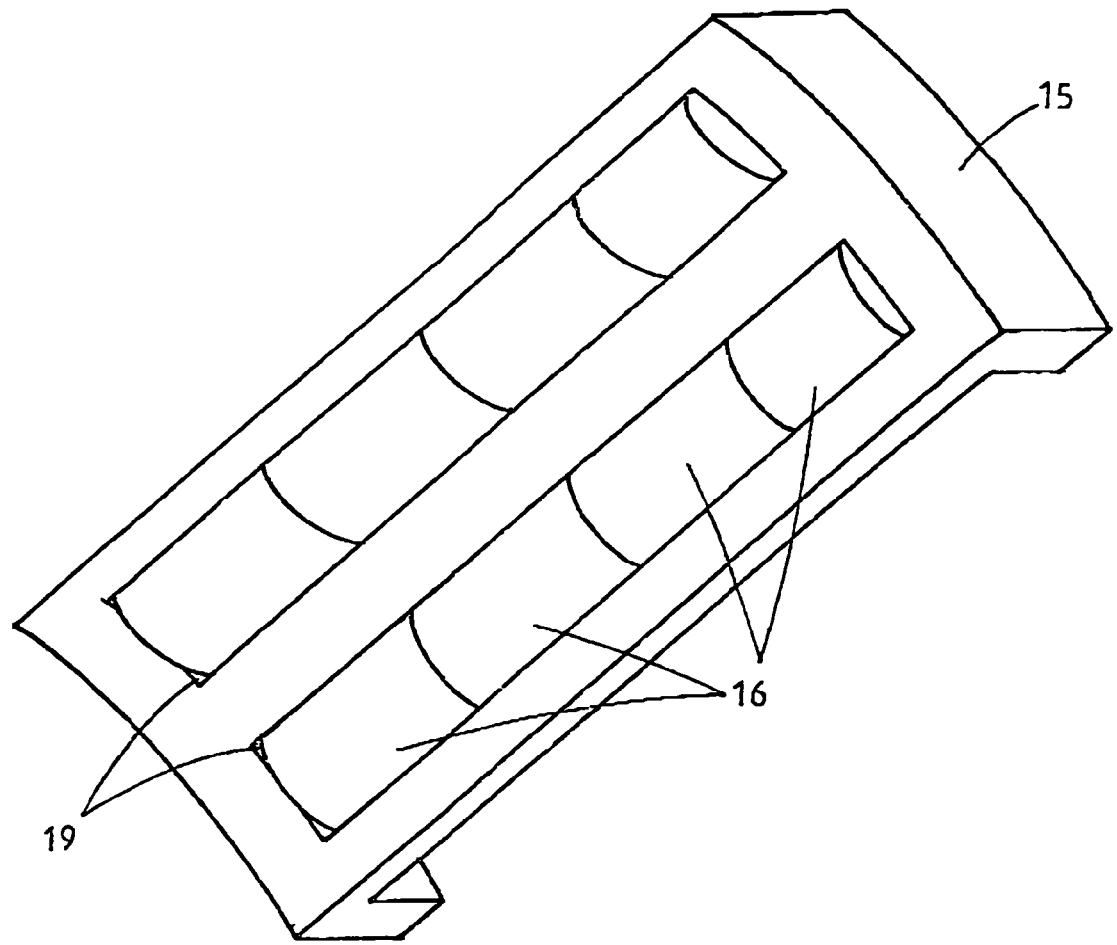
FIG. 6: shows a section of the cage assembly of the mechanism of FIG. 5 for holding the rollers in place.

Referring now to FIG. 5 there is shown a clamping mechanism suitable for gripping an oil field tubular such as a drill pipe, tubing or casing. First and second jaws 11 and 12 are pivotable about respective rods 13 and 14. Jaw 11 includes a semi-circular cage 15 containing rollers 16. Jaw 12 includes a semi-circular cage 17 containing rollers 18. A partial perspective view of a portion of semi-circular cage 15 is shown in FIG. 6. It will be seen that openings 19 are provided in cage 15 which allow rollers 16 to protrude therethrough but are sized so as not to allow rollers 16 to escape from cage 15.

The inner faces of jaws 11 and 12 adjacent cage assemblies 15 and 17 have recesses formed therein, similar to the recesses 3 shown in FIG. 1. Springs 20 (only one pair of which are indicated on each side) centrally bias rollers 16 and 18 within the recesses. Other suitable biasing means such as resilient materials may also be employed in place of springs 20.

Figure 7:
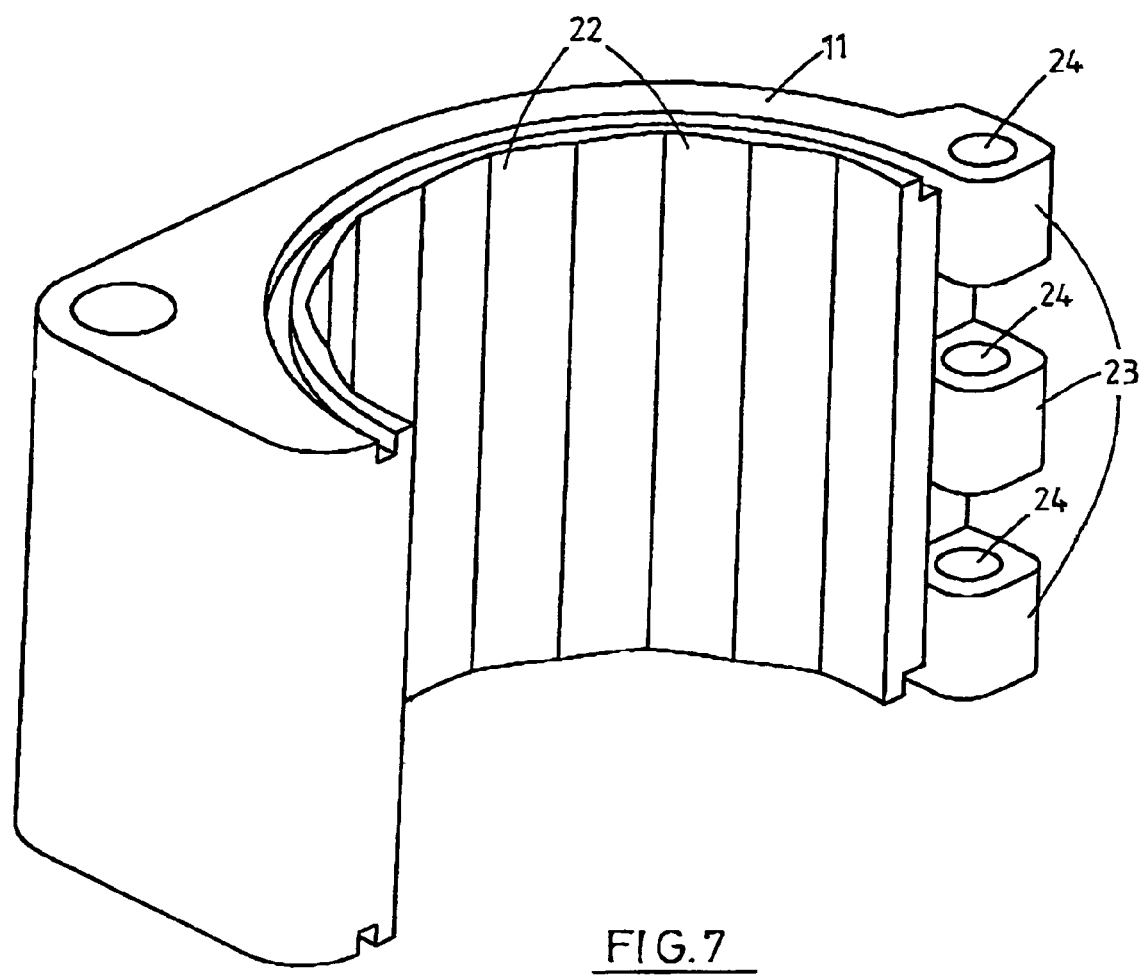
FIG. 7: shows a jaw of the clamping mechanism shown in FIG. 5.

Jaws 11 and 12 may pivot away from each other about rods 13 and 14 so that the jaws may open. This enables a tubular member 21 to be laterally introduced between the jaws and the jaws closed to retain the tubular member 21 therewithin. Jaw 11 (as shown in FIG. 7) includes recesses 22 formed on the inside face thereof and is provided with a plurality of fingers 23 at the distal end thereof. Fingers 23 have bores 24 therethrough.

Figure 8:
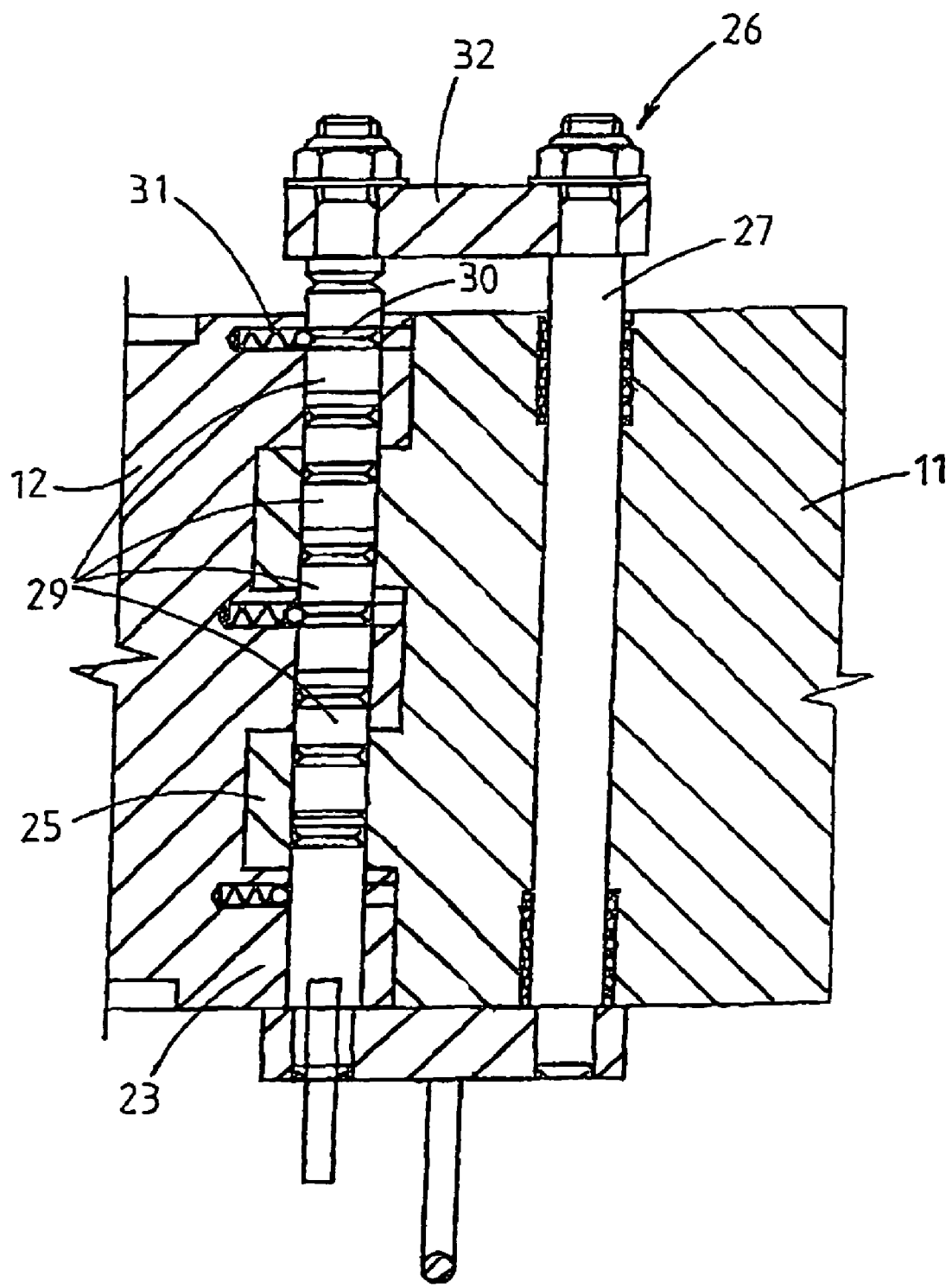
FIG. 8: shows a locking mechanism for securing the distal ends of the jaws of the clamping mechanism shown in FIG. 5 together.

As best shown in FIG. 8 arm 12 is seen to be provided with complimentary fingers 23 (only one of which is indicated) which interengage with fingers 25 (only one of which is indicated) when the jaws are in the closed position. Jaw 11 supports a locking assembly 26. The locking assembly includes a guide rod 27 located within a bore in arm 11 which allow the locking assembly to slide up and down between opened and closed positions.

Each of the fingers 23 and 25 are seen to include a locking pin section 29 having a respective groove 30 formed therein (one of which is indicated). When the locking assembly 26 is in the raised position, shown in FIG. 8, the locking pin sections 29 extend from one finger 23 to an adjacent finger 25. This locks the distal ends of arms 11 and 12 together. Spring loaded pins 31 (only one of which is indicated) are biased within grooves 30 in this position to retain the locking pin sections 29 in place.

When the locking assembly is forced down so that plate 32 abuts arms 11 and 12 the locking pin sections 29 are positioned so as to be located entirely within the bore of a single finger 23 or 25. This allows the distal ends of arms 11 and 12 to be separated and the clamping mechanism to be opened.

In use, jaws 11 and 12 are pivoted apart so as to provide an opening which will allow a tubular member to be introduced laterally within the clamping mechanism. Jaws 11 and 12 are then pivoted towards one another and locking mechanism 26 is lifted so as to lock the distal ends of arms 11 and 12 together (as shown in FIG. 5).

When cages 15 and 17 are in their initial positions rollers 16 and 18 are positioned adjacent the apexes of the recesses formed in the jaws. This allows a tubular 21 to be rotated in either direction. When it is desired to grip tubular 21, cages 15 and 17 are rotated relative to jaws 11 and 12 in the direction in which rotation is to be restrained. This brings rollers 16 and 18 into engagement with their respective ramp surfaces so as to wedge rollers 16 and 18 between tubular 21 and jaws 11 and 12. To release tubular 21 it may be rotated in the opposite direction and locking mechanism 26 lowered to open the jaws.

FIG. 6 shows a portion of a cage 15. As shown in FIG. 6 the rollers 16 preferably comprise a number of separate stacked rollers. This allows the rollers to maintain better contact over the section of tubular to be clamped, as some sections may have dents or other deformations.

The axial length of each jaw 11, 12 will typically be in a range of from 10 to one times the nominal pipe diameter. The roller element 16 will typically have a diameter of from 0.01 to 0.5 times the nominal pipe diameter. The axial length of the roller elements 16 will preferably be between 0.1 to twice the nominal pipe diameter.

Figure 9:
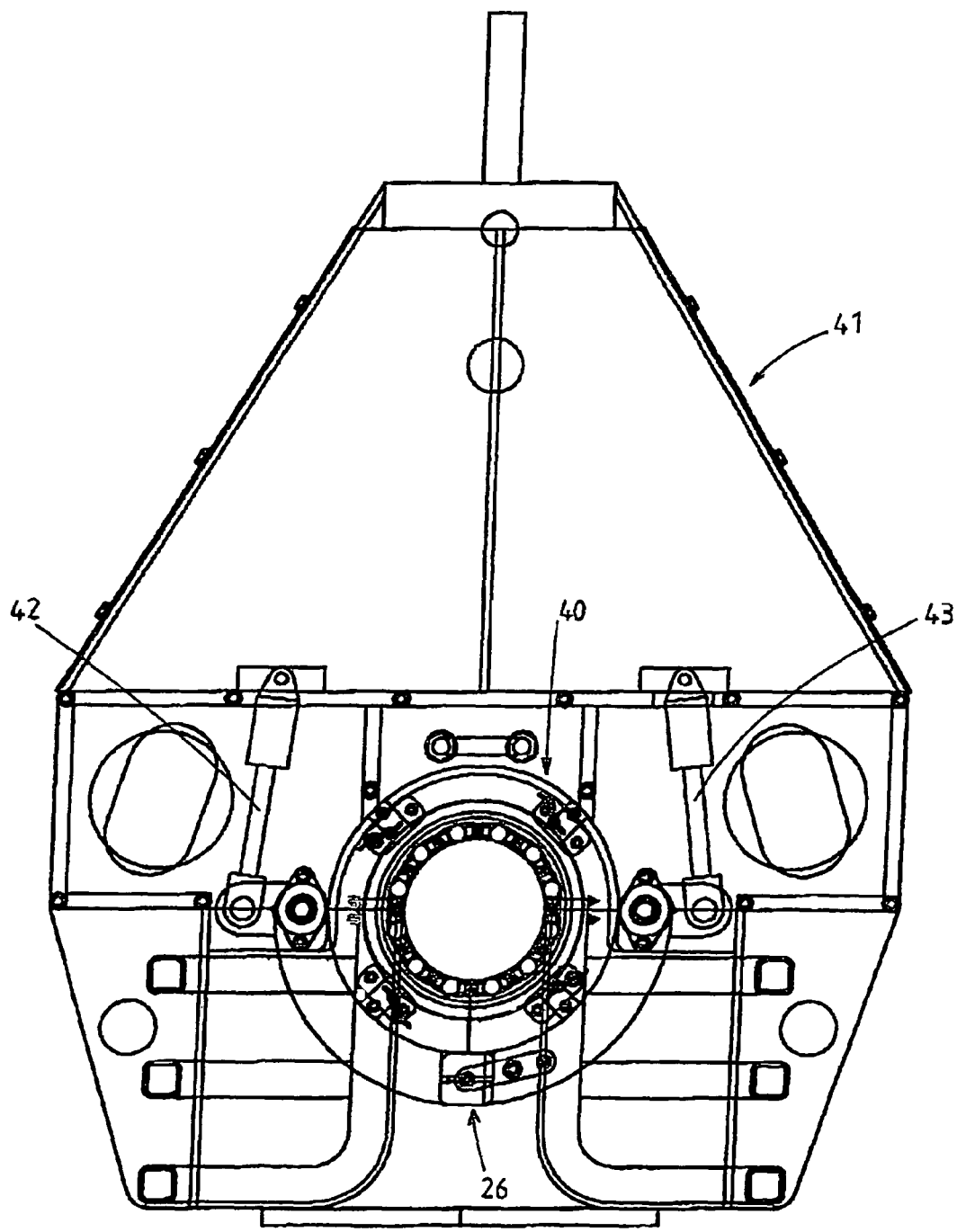
FIG. 9: shows the clamping mechanism of FIGS. 5 to 8 incorporated within an automated oil field tubular handling device.

FIG. 9 shows an automated tubular handling mechanism incorporating the clamping mechanism shown in FIGS. 2 to 6. Clamping mechanism 40 is contained within a tubular handling apparatus 41. Rams 42 and 43 may be driven to rotate arms 11 and 12 into their opened and closed positions and a further ram, (not shown), may be used to move the locking mechanism 26 between its opened and closed positions.

Figure 10:
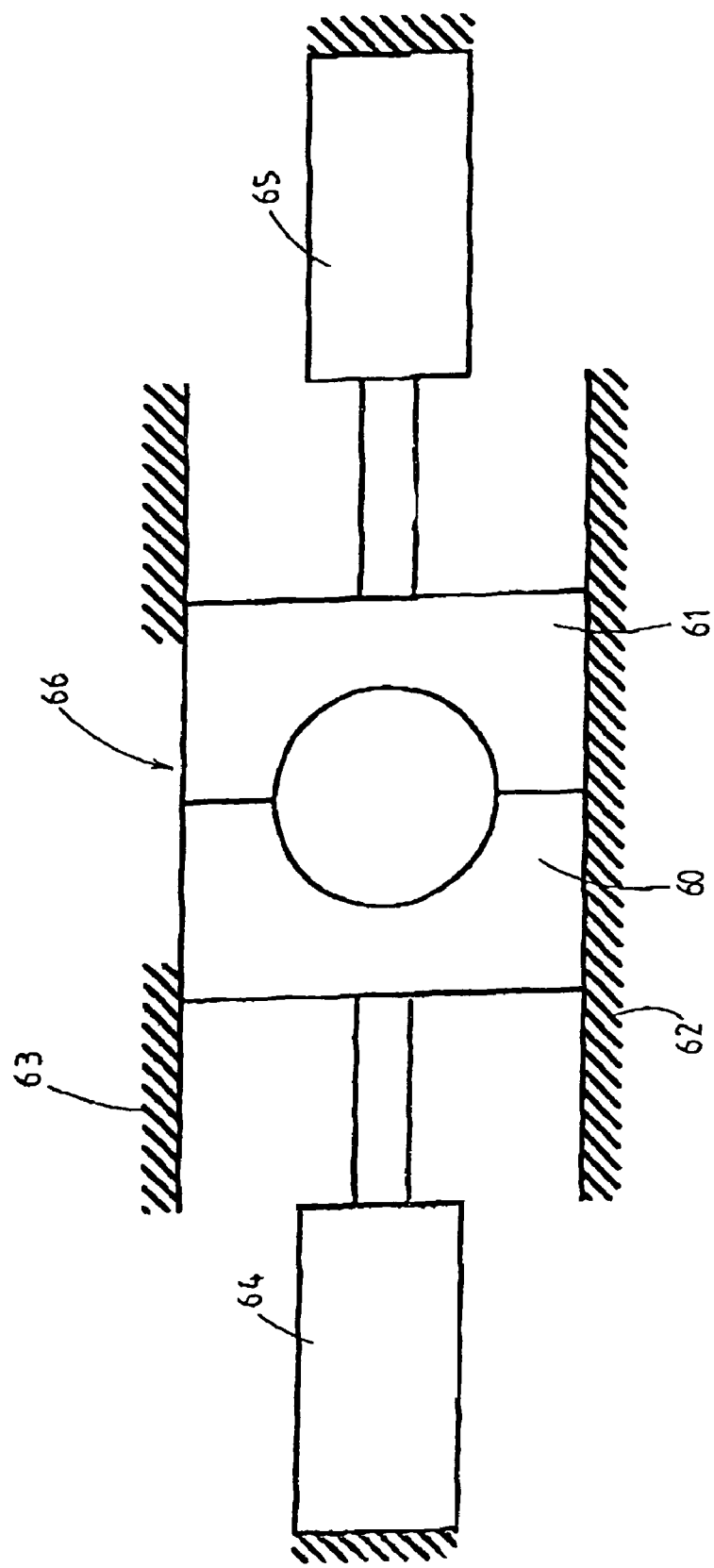
FIG. 10: shows an arrangement utilizing jaw sections opened and closed by opposed rams.

Referring now to FIG. 10 an opposed arrangement is shown in which jaw sections 60 and 61 are guided within guides 62 and 63. Jaws 60 and 61 are driven apart and together by rams 64 and 65. A pipe may be laterally introduced through the opening at 66 when the jaws are moved apart.

Referring now to FIG. 11 another configuration is shown, similar to that shown in FIG. 10. Jaws 67 and 68 are guided within guides 69 and 70 and are driven together and apart by ram 71. As only a single ram 71 is utilized in this example a locking mechanism of the type shown in FIG. 8 is required at 72.

Figure 12A:
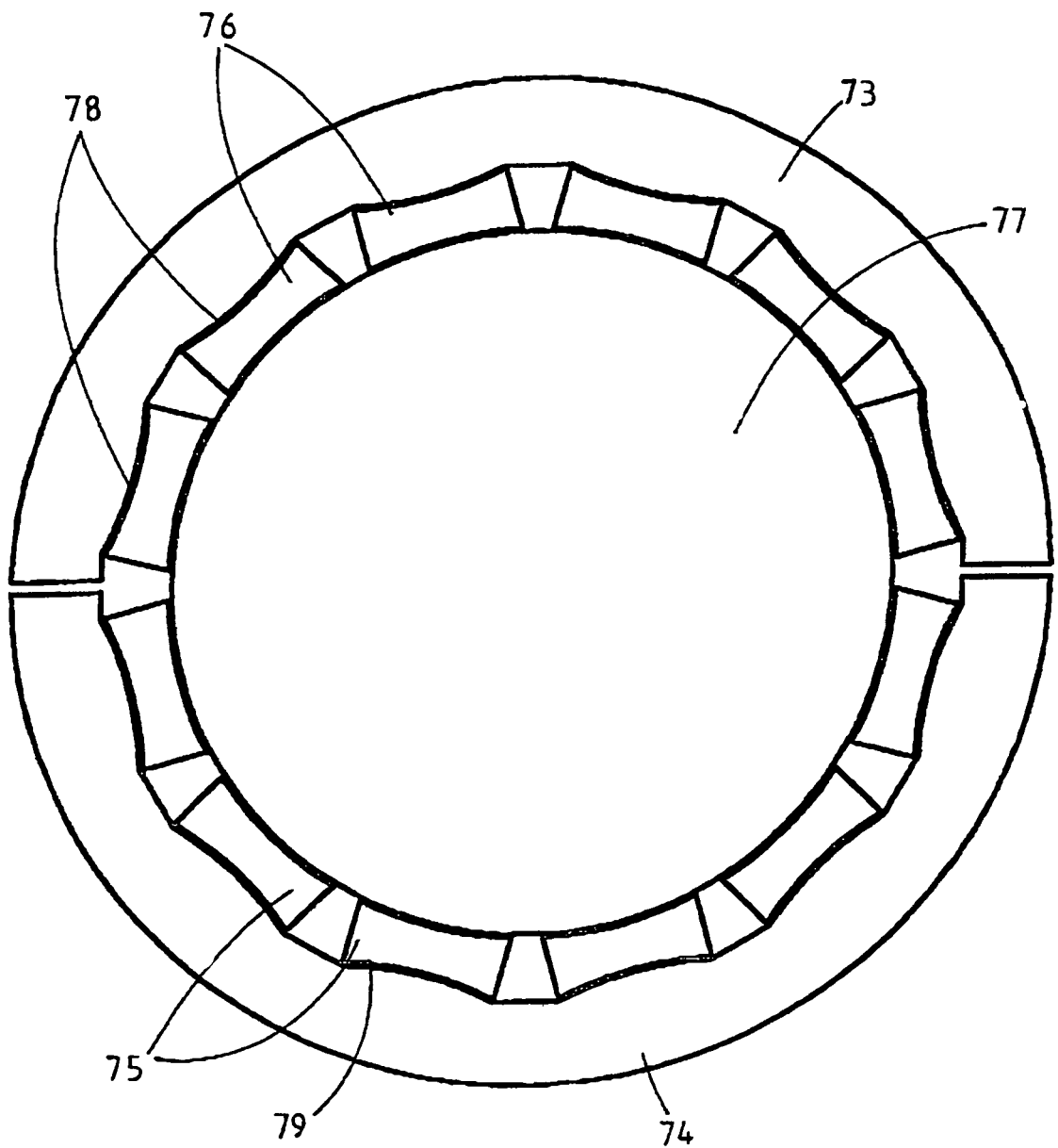
FIG. 12a: shows a slip including a gripping mechanism for restricting axial movement of a tubular.

FIG. 12a shows a gripping mechanism suitable for use as slips in a drilling rig. A slip is designed to grip an oil field tubular and restrain it from longitudinal movement due to the weight of the string. In this case rollers 75 and 76 are provided about the inside of jaws 73 and 74 in an orientation transverse to the axis of oil field tubular 77. Rollers 75 and 76 have flanged ends so that the roller profile closely matches that of the tubular 77 it is designed to grip. Corresponding ribs 78 and 79 locate and guide rollers 75 and 76 axially along jaws 73 and 74. Guides 78 and 79 taper inwardly from the tops to the bottoms of the jaws so that, in use, as rollers 75 and 76 are drawn down they become wedged between tubular 77 and jaws 73 and 74.

In use jaws 73 and 74 may be translated apart to allow a tubular 77 to be laterally introduced. Jaws 73 and 74 may then be closed and secured together. Rollers 75 and 76 may be retained within respective cages. The cages may be maintained at an elevated position whilst jaws 73 and 74 are closing and be urged downwardly, perhaps by gravity, once jaws 73 and 74 are closed. As guides 78 and 79 taper inwardly towards the bottoms of the jaws rollers 75 and 76 will thus be wedged between tubular 77 and jaws 73 and 74 as tubular 77 is pulled down. This arrangement could be substituted for a conventional slip assembly.

Figure 12B:
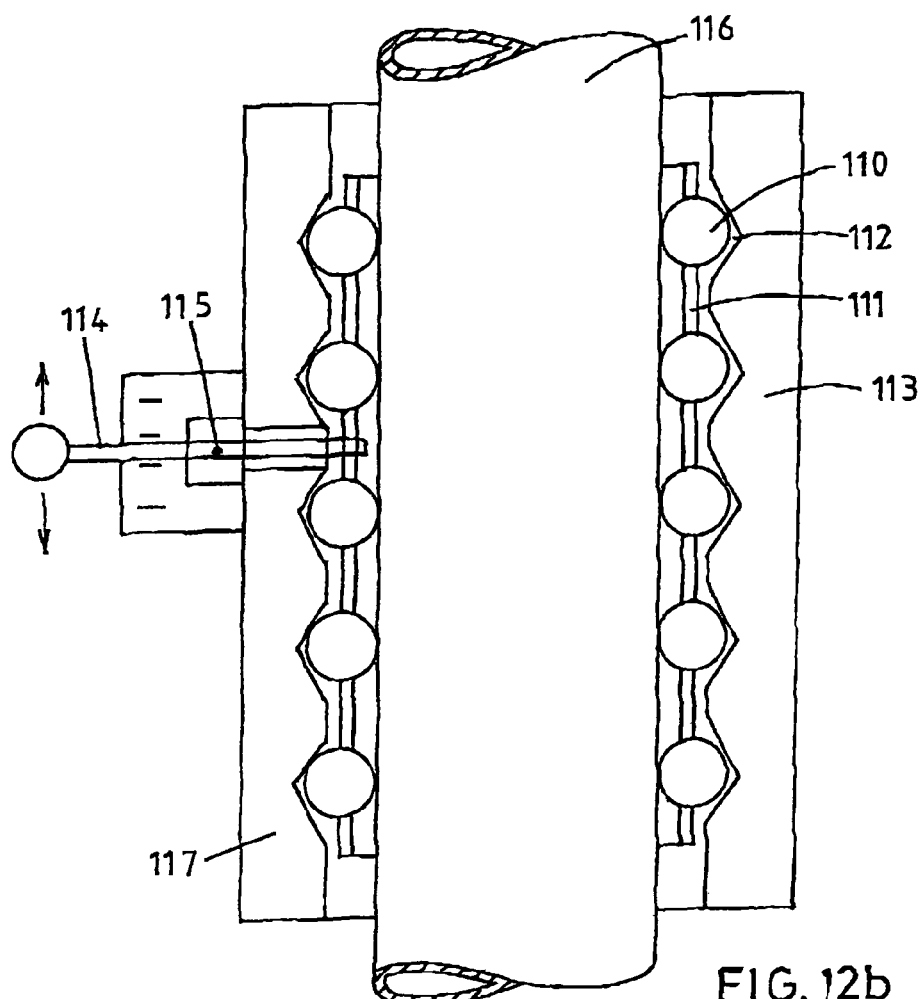
FIG. 12b: shows a cross sectional view of a slip.
Figure 12C:
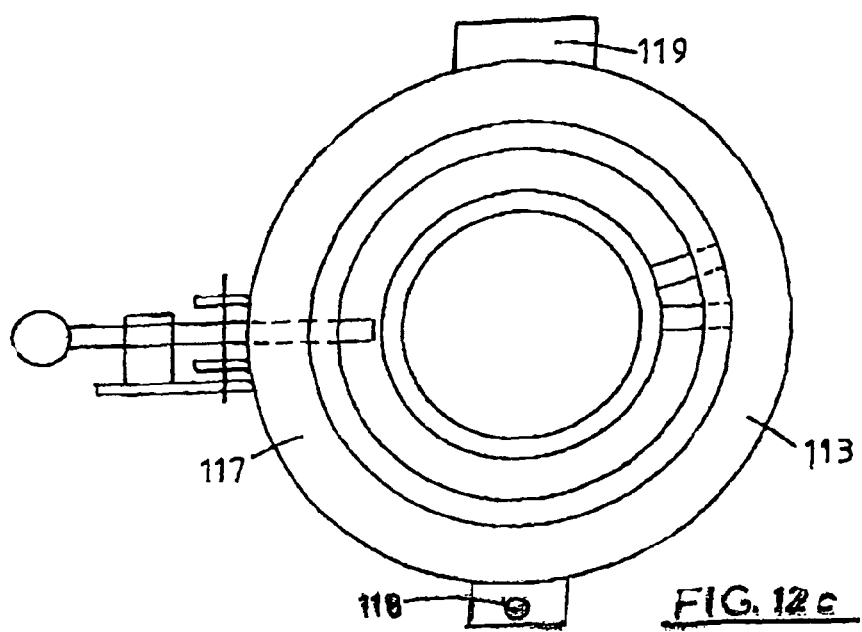
FIG. 12c: shows an end view of the slip shown in FIG. 12b.

Referring now to FIGS. 12*b* and 12*c* a slip having an actuating mechanism is shown. In this embodiment a plurality of button type rollers 110 are retained within a cage 111. The rollers are located within annular recesses 112 within the jaw bodies 113. An actuating lever 114 is pivotable about pin 115 and vertical movement of lever 114 thus causes vertical movement of cage 111. Upward movement of lever 114 causes cage 111 to move downwardly and prevents downward movement of a drill string 116 within the slip. Downward movement of lever 114 prevents upward movement of drill string 116 with respect to the slip. When lever 114 is in the middle position (as shown) the drill string can move in either direction. This enables a user to selectively control movement of a drill string relative to the slip.

Referring now to FIG. 12*c* it will be seen that the slip comprises two jaws 113 and 117 pivotable about hinge 118 and closed by a closing device 119.

In another embodiment the outer profile of jaw bodies 113 may taper from the top to the bottom and the jaws may be received in a body, having a bore of a profile corresponding to the outer profile of the jaws. In this way the jaws close about a tubular as the jaws are located within the bore in the body.

Figure 12D:
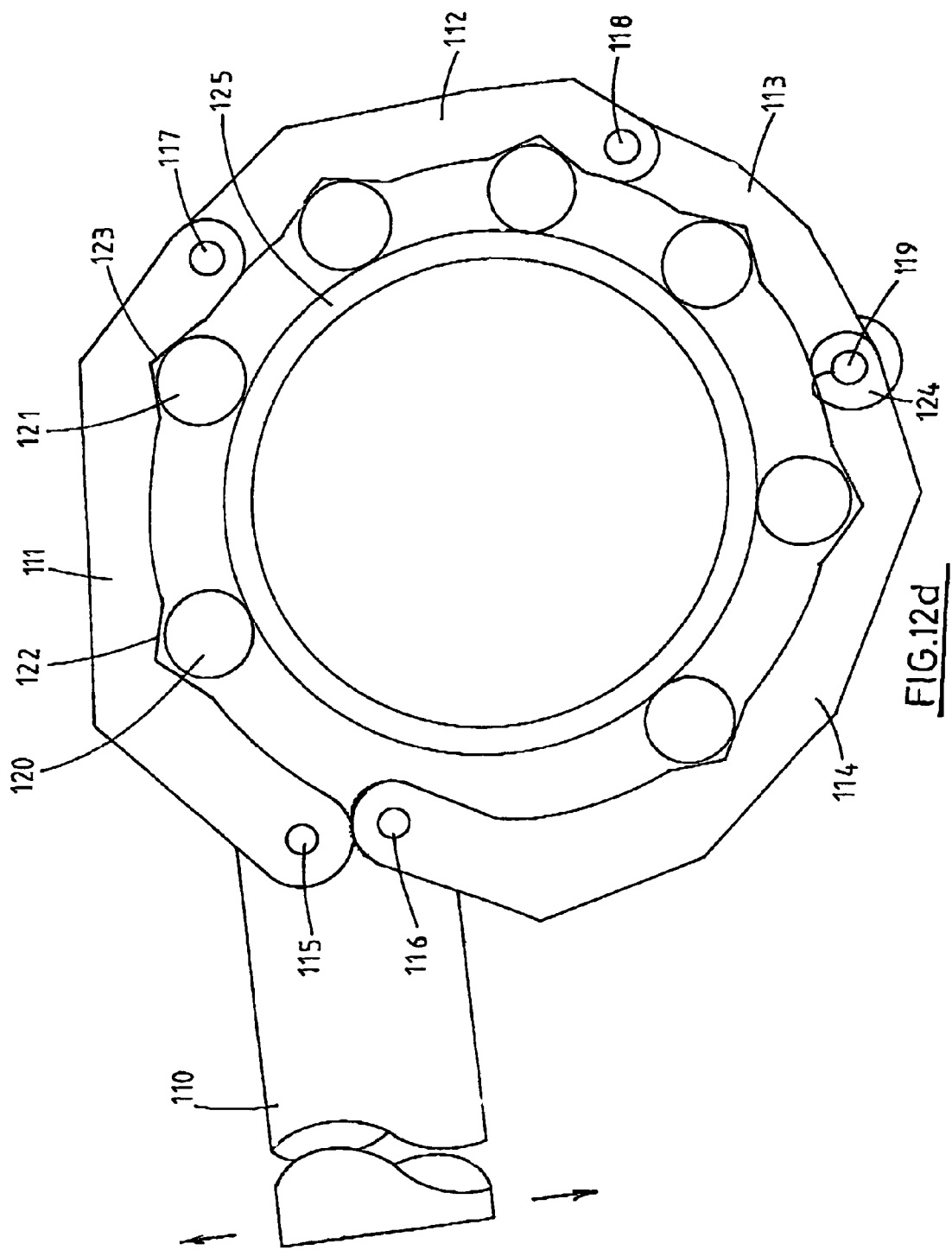
FIG. 12d: shows a pipe clamp.

Referring now to FIG. 12*d* a pipe clamp is shown. The pipe clamp includes a handle 110 having jaw sections 111 to 114. Jaw sections 111 and 114 are pivotable connected to handle 110 at points 115 and 116. Jaw sections 111 and 112 are pivotably connected at 117, jaw sections 112 and 113 are pivotably connected at 118 and jaw sections 113 and 114 are pivotally connected at 119.

Jaw 111 has associated rollers 120 and 121 which locate within recesses 122 and 123 of jaw 111. Rollers are likewise provided in recesses in the other jaw sections.

Jaw sections 113 and 114 are connected together by a latch 124. This enables the part clamp to be fitted about a pipe and then secured together by latch 124 securing together jaws 113 and 114. Additional jaw sections may also be inserted between jaw sections 113 and 114 to allow larger pipes to be gripped.

In use, the jaw sections are fitted about a pipe and latch 124 secures jaw sections 113 and 114 together. Handle 110 may then be rotated about the pipe. This causes pivot points 115 and 116 to move with respect to one another so as to tighten the jaw sections about the pipe 125. This forces rollers 120 and 121 etc. tightly into recesses 122 and 123 so as to firmly retain pipe 125 with respect to the pipe clamp. The use of rollers 120 and 121 minimizes any damage to the pipe.

Figure 13:
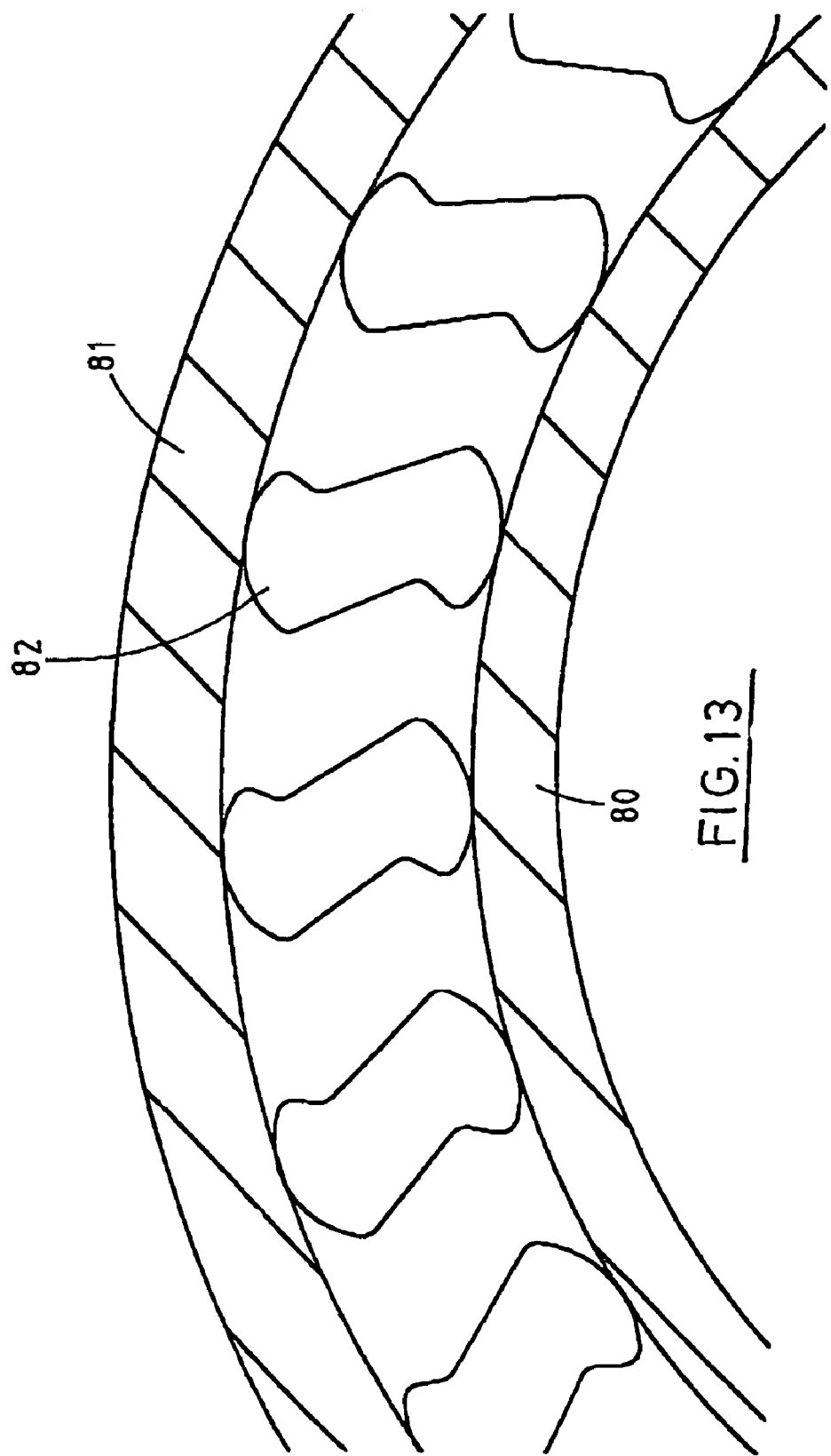
FIG. 13: shows a dog bone gripping member.

Referring now to FIG. 13 an alternative embodiment is shown in which asymmetric gripping elements are employed. Instead of the rollers previously described, having circular cross-sections, rollers having non-circular gripping elements may be employed. In the embodiment of FIG. 13 a dog bone 82 is shown between the surfaces of a pipe 80 and a jaw 81. The outer surface of pipe 80 and inner surface of jaw 81 are substantially circular in cross-section. The asymmetric shape of dog bone 82 means that relative rotation between part 80 and jaw 81 causes dog bone 82 to rotate. As it rotates sections of dog bone 82 having increasing diameter are positioned between part 80 and jaw 81 until dog bone 82 wedges part 80 and jaw 81 together. It will be appreciated that gripping means incorporating dog bones may be substituted in the examples previously described.

Figure 14:
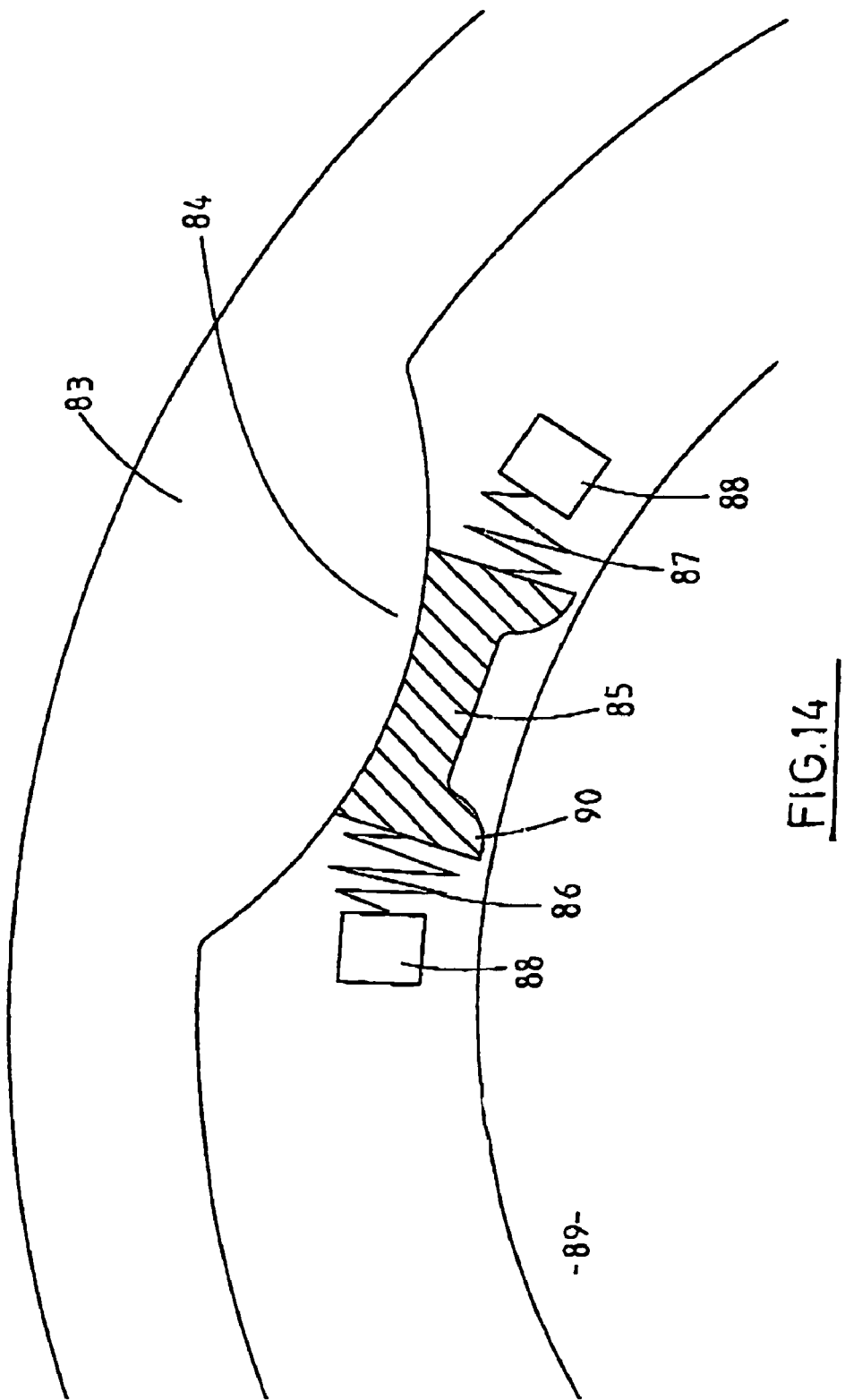
FIG. 14: shows an inverted cam gripping member.

Referring now to FIG. 14 a further alternative gripping means is described. In this embodiment a jaw or outer race 83 has a plurality of axial ribs distributed about the interior thereof. Cams 85 engage ribs 84 and their orientation is adjusted by forces applied via springs 86 and 87 from cage 88. In use cage 88 is initially positioned so that cam 85 assumes the position shown in FIG. 14. When cage 88 is moved to the left with respect to race 83 spring 86 tilts cam 85 so that its right hand end 90 engages pipe 89. Movement of pipe 89 to the left with respect to jaw 83 causes cam 85 to become wedged and locks pipe 89 and jaw 83 together. Again such gripping element could be substituted for those previously described.

Figure 15:
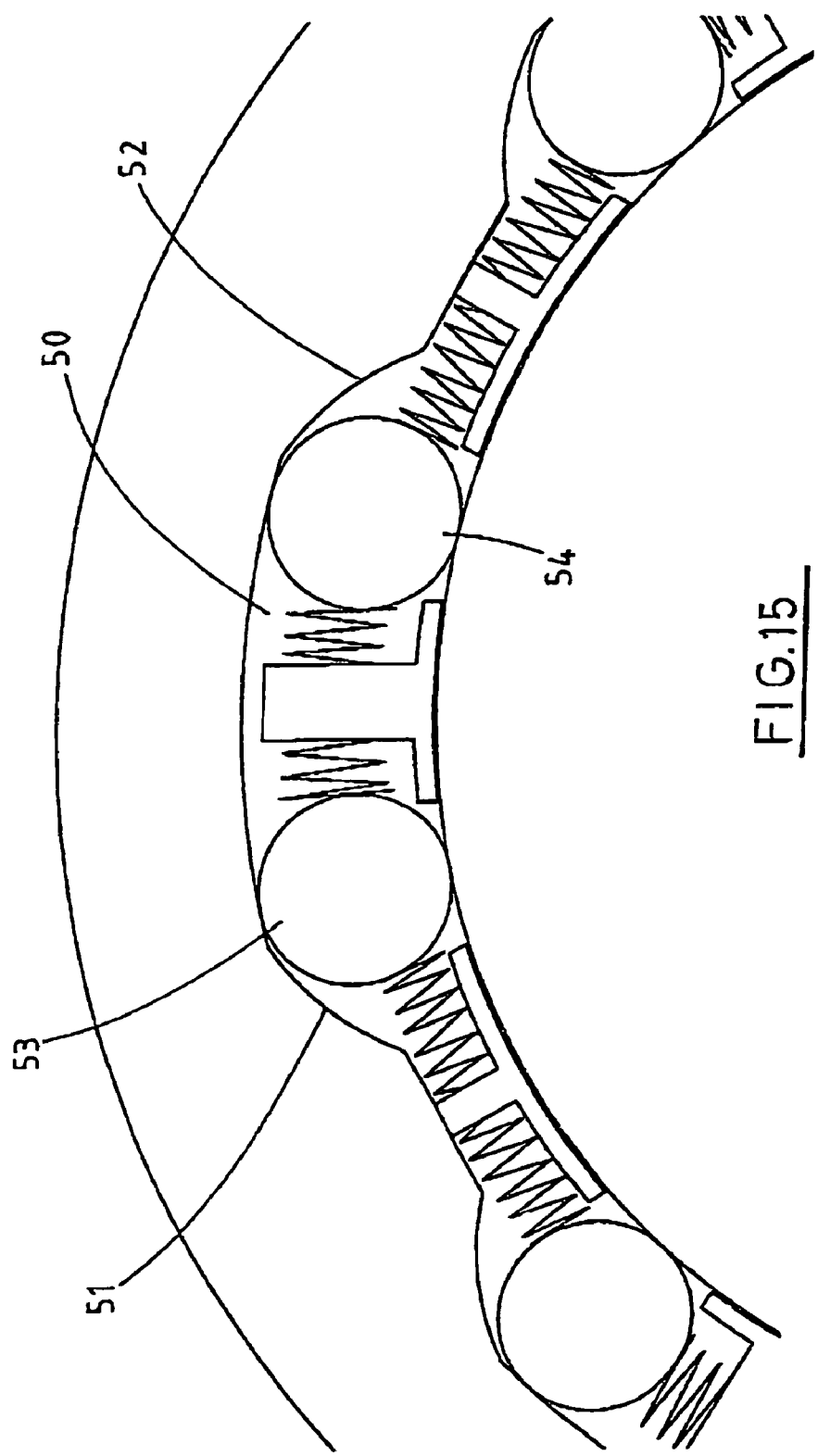
FIG. 15: shows an alternative wall profile of a jaw.

Referring now to FIG. 15 an alternative recess profile is shown. In this embodiment recess 50 has a ramp portion 51 at one end and a corresponding ramp portion 52 at the other end. In this case two rollers 53 and 54 are located within the single recess 50. It will be appreciated that in this embodiment roller 53 will engage the tubular when it is rotated in one direction and roller 54 will engage the tubular when it is rotated in the opposite direction. Again this arrangement may be substituted for the arrangements described.

Figure 16:
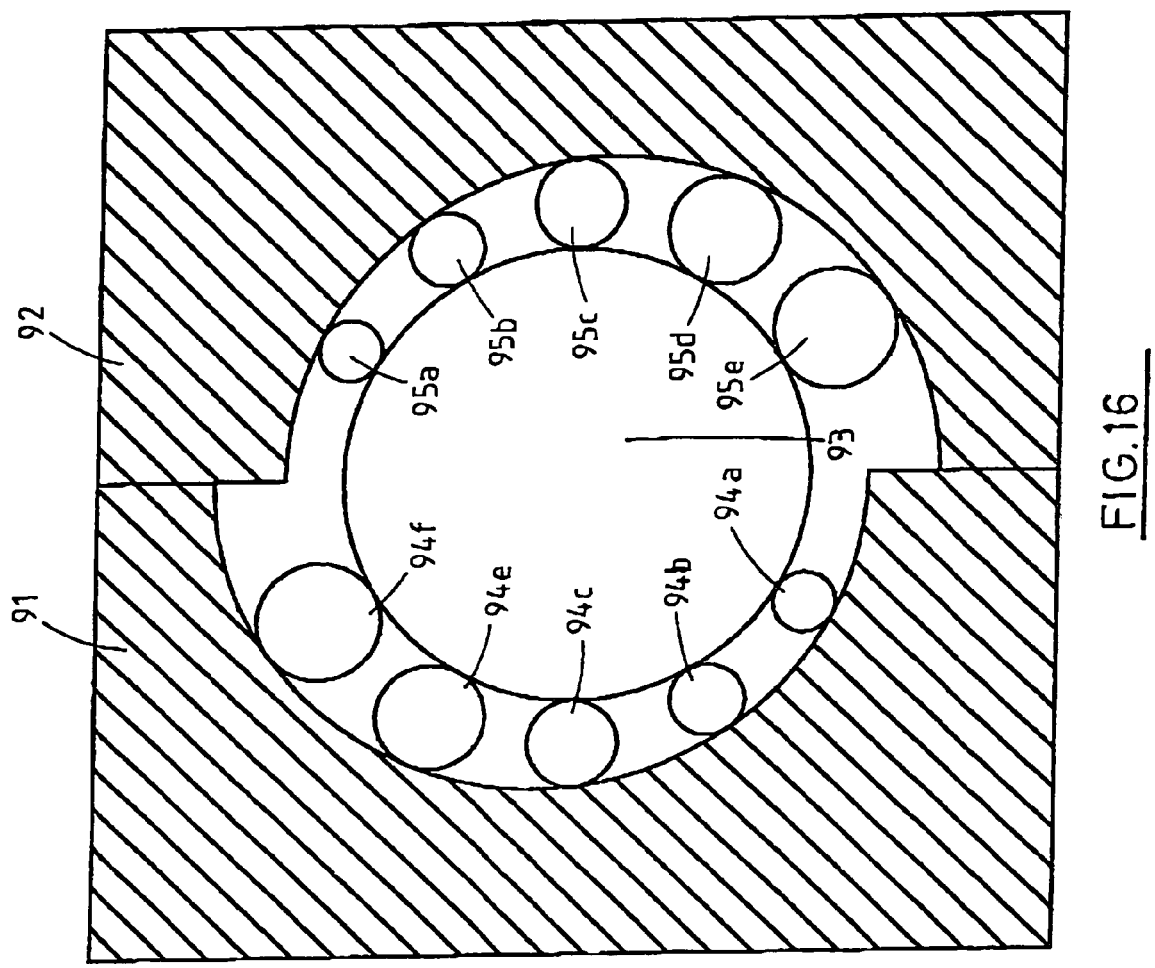
FIG. 16: shows a gripping mechanism utilizing an off set housing with graduated rollers.

FIG. 16 shows an alternative construction in which jaws 91 and 92 are offset with respect to one another and graduated rollers 94*a* to 94*f* and 95*a* to 95*f* are provided between jaws 91 and 92 and pipe 93. This arrangement has the advantage that axial recesses do not need to be formed in the inner faces of the jaws as the offset construction provides a natural wedge between the inner face of jaws 91 and 92 and pipe 93.

Figure 17:
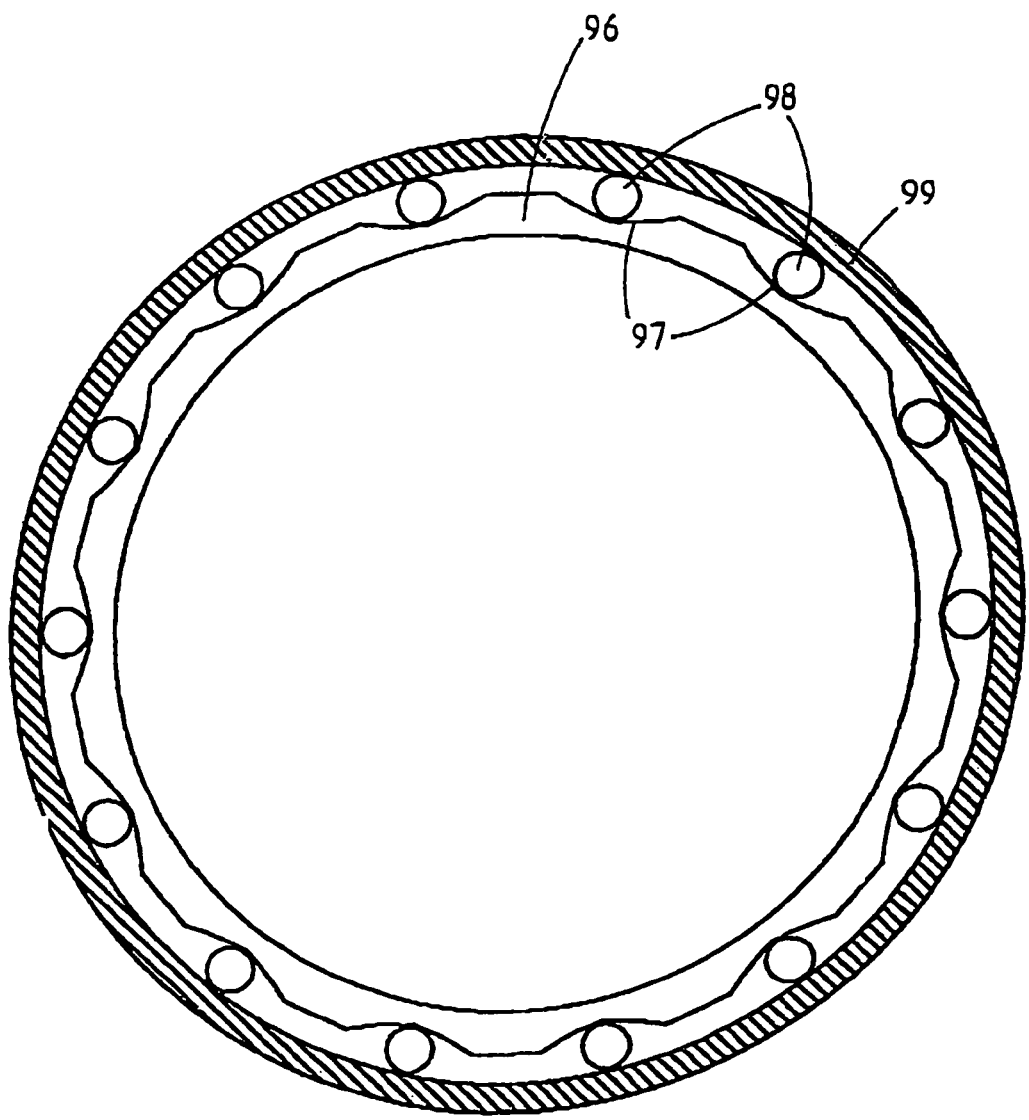
FIG. 17: shows an arrangement for internally gripping a pipe.
Figure 18:
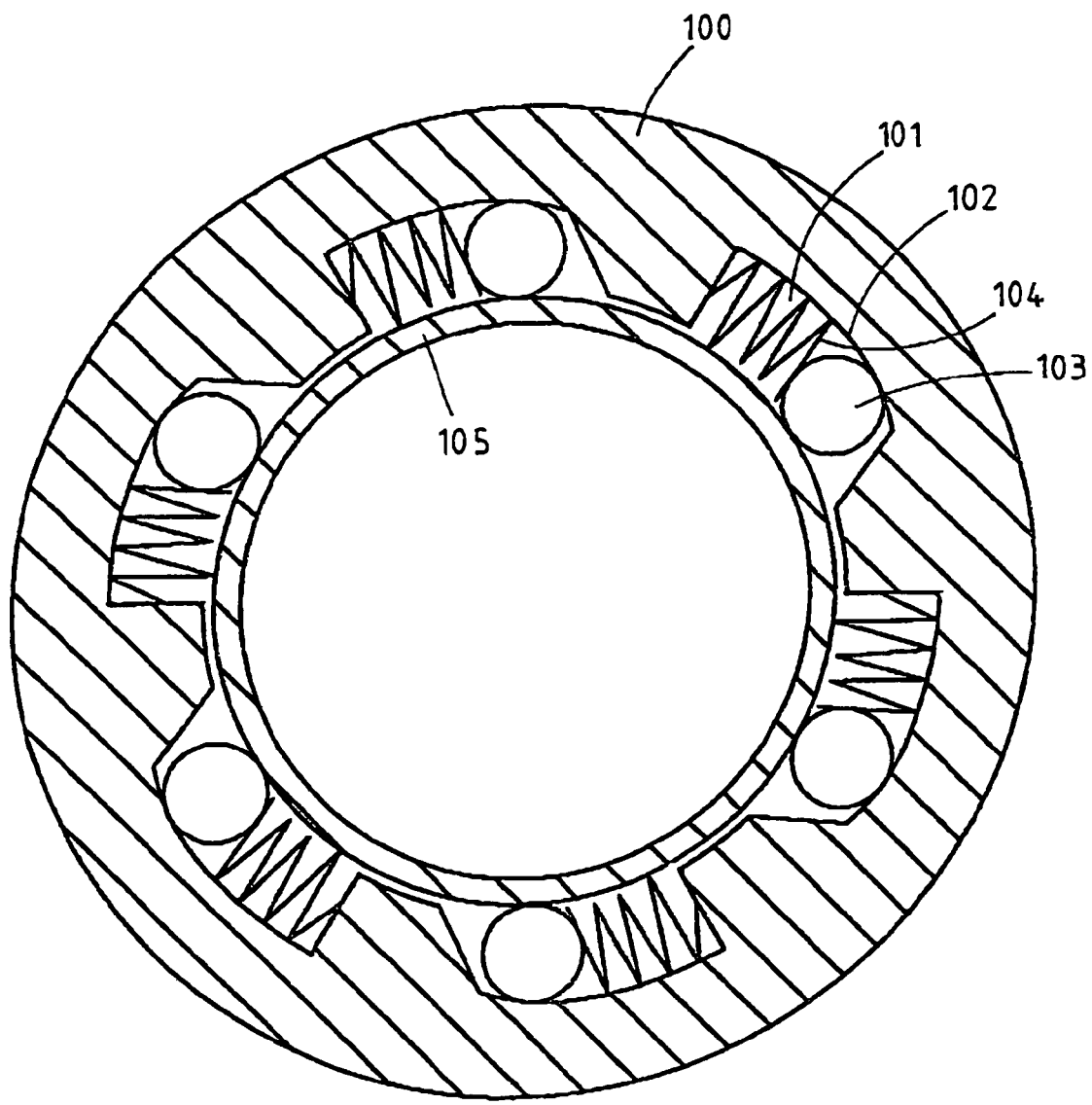
FIG. 18: illustrates a known sprague type clutch.

FIG. 17 illustrates that the invention may equally be applied to gripping the interior or exterior of an object. FIG. 17 illustrates how the invention may be utilized to grip a pipe 99 from the interior rather than exterior. The same applies to the clutch previously described. In this case tubular body 96 has axial recesses 97 formed in the exterior thereof and rollers 98 located within the recesses. The rollers may be accommodated within a cage which enables actuation of the gripping means as previously described.

Although the clamping mechanism has been described in relation to the clamping of oil field tubulars it is to be appreciated that it may have application in other areas also. The clamping mechanism may be incorporated into a hand tool to grip sections of pipe. A ratchet system may be incorporated to allow incremental rotation.

It will thus be seen that the invention provides a clamping mechanism suitable for restraining a tubular against high rotational torques in either direction without damaging the tubular. The clamping mechanism may be incorporated within existing tongs of oil field tubular handling apparatus. The clamping mechanism may be operated quickly and easily and requires no lubrication.

The clutch of the invention is selectively actuateable and may operate in either direction. The clutch may be incorporated as an emergency brake on a vehicle drive shaft, conveyor system etc or where a temporary brake is required and the shaft end is not accessible.

Referring now to the embodiments of FIGS. 19-25, a gripping mechanism designated generally at 201 comprises a pair of jaws 202,203 which are each mounted on respective pivot shafts 204,205. The jaws 202,203 can be pivoted apart by handles 206,207 to the open position shown in FIG. 24, in which a pipe string 208 can be introduced into the bore 239 between the jaws. The jaws are then closed and secured by means of a closing key 209.

Figure 19:
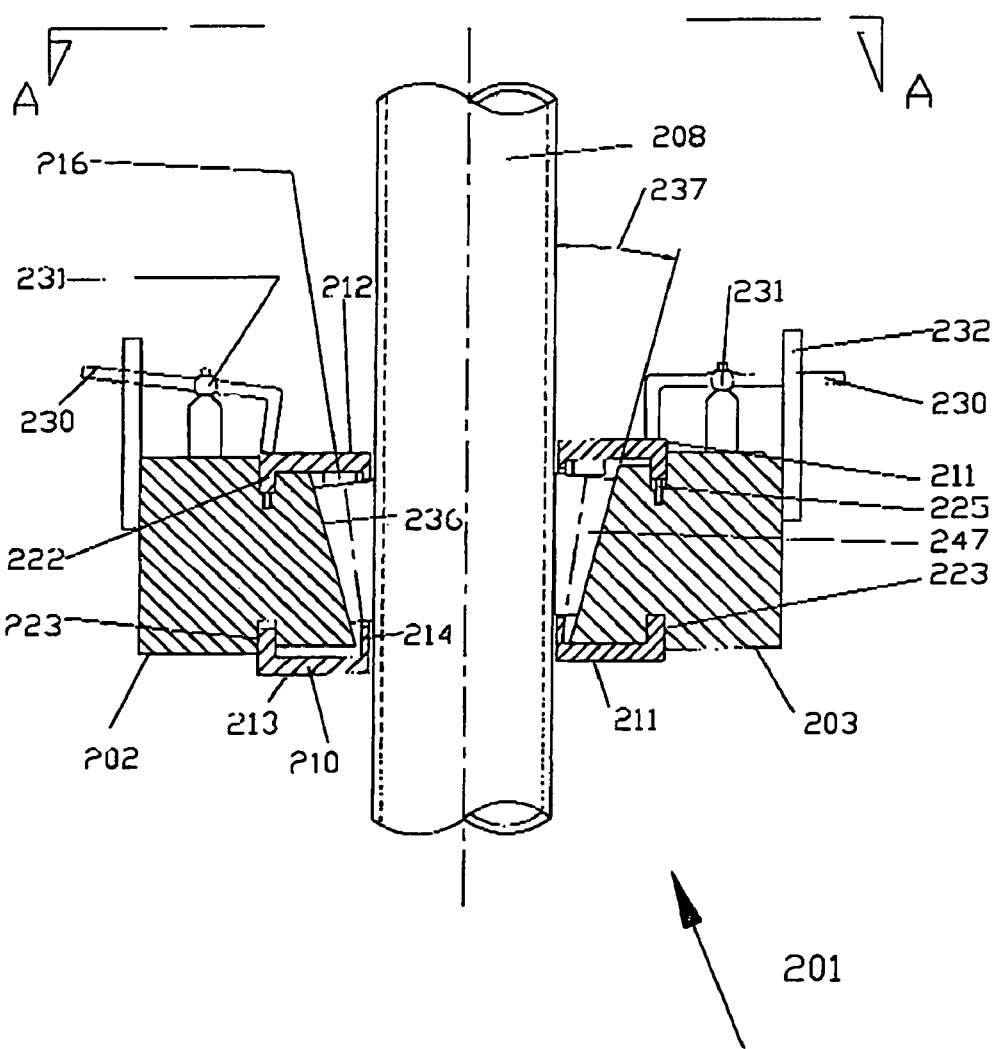
FIG. 19 is a sectional side view of a pipe string gripping mechanism.
Figure 20:
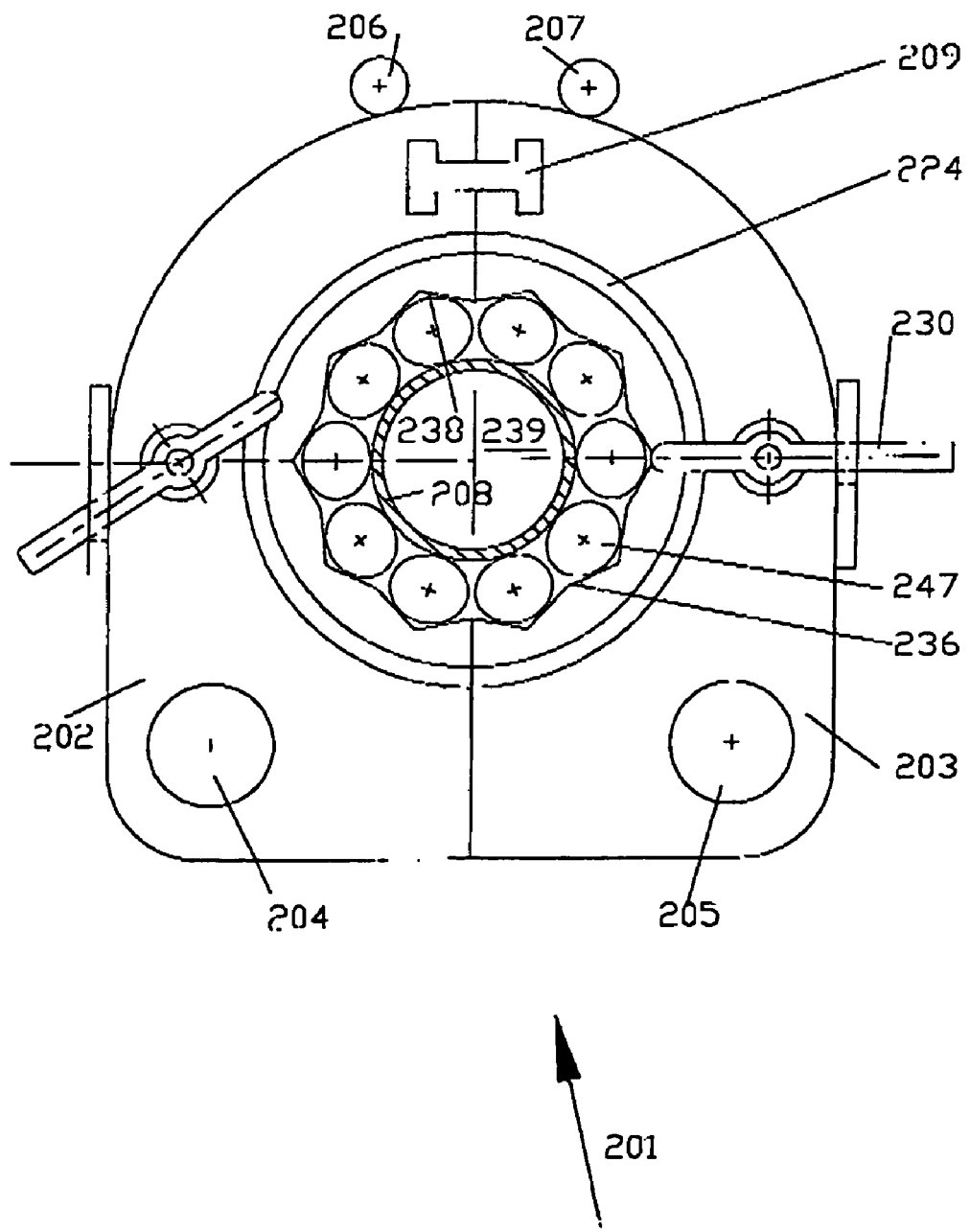
FIG. 20 is a cross-section taken along line A-A in FIG. 1.
Figure 22A:
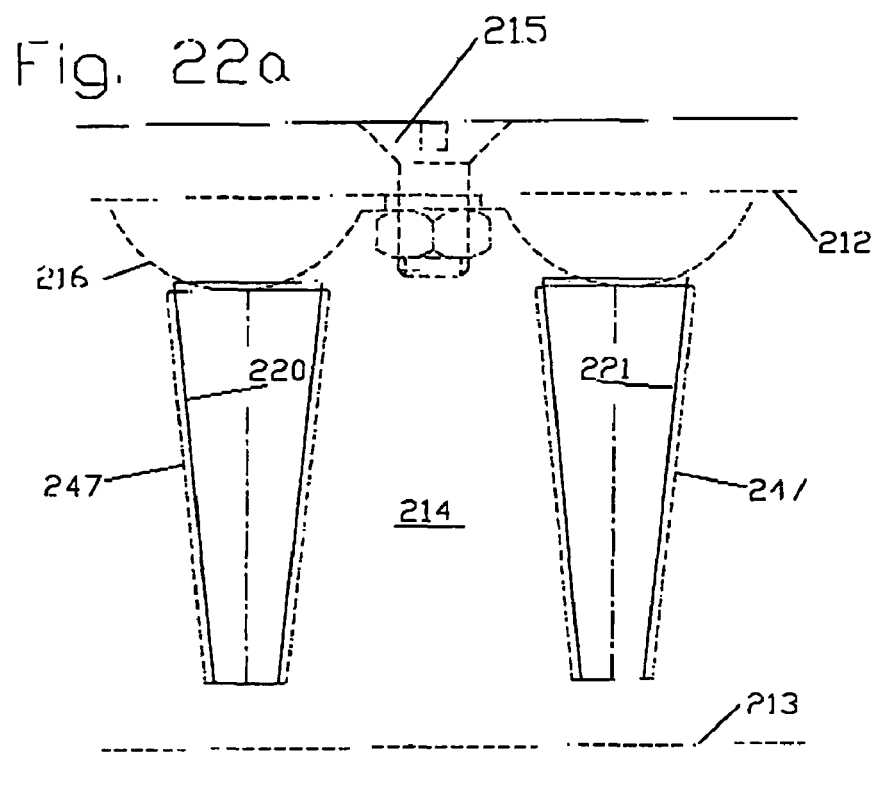
FIG. 22a is a view of the cage as viewed from inside the bore of the mechanism, with no pipe casing present.

Referring to FIG. 19, each jaw 202,203 carries a respective cage 210,211 (not shown in FIG. 20). The two cages are identical so only cage 210 will be described in detail. The cage 210 has a semi-cylindrical body portion 214 with upper and lower flanges 212,213. FIG. 22*a* shows the cage 210 as viewed from inside the bore between the jaws with the pipe string 208 removed. As shown in FIG. 22a, the upper flange 212 carries a fastener 215 which secures a leaf spring 216 to the underside of the flange 212. The leaf spring 216 has a pair of semicircular projections which each engage a relatively wide upper end of a respective roller 247 to apply a downward biasing force. The rollers 247 are frustoconical in shape and formed from 420 stainless steel. The rollers 247 each protrude partially through a respective tapered slot 220,221 which is slightly narrower than the rollers to prevent the rollers from passing through the slots. The relatively narrow lower ends of the rollers are biased against the base of the slots 220,221 by the leaf spring 216 to secure the rollers in place.

Referring to FIG. 19, the upper and lower flanges 212,213 each have guides 222,223 which are received in respective upper and lower cage grooves in the jaws 202,203. The upper cage groove 224 is shown in the plan view of FIG. 20. The upper cage groove 224 contains a return spring 225 shown in FIG. 19 which applies an upwards biasing force to the cage guide 222.

Figure 21:
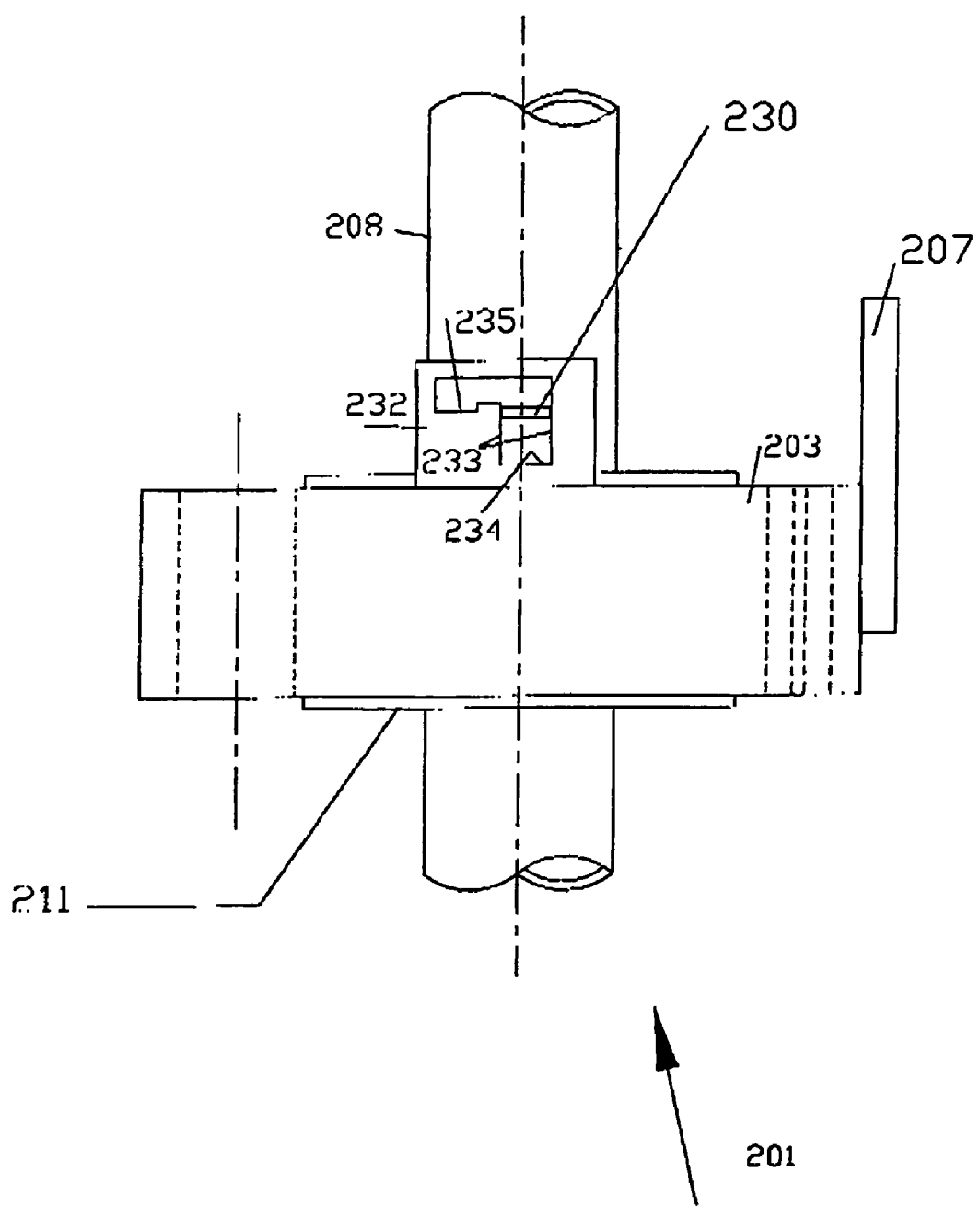
FIG. 21 is a side view of the mechanism from the right-hand side of FIG. 1 with the actuator handle in a partially raised position.

Each cage 210,211 can be driven downwards against the force of the return spring 225 by a respective actuation mechanism. Only the actuation mechanism driving cage 211 will be described. The mechanism comprises an L-shaped actuation arm 230 pivotally mounted to the jaw 203 by a rose joint 231. Referring to FIG. 21, a plate 232 fixed to the jaw 203 has an L-shaped slot 233 which receives the actuation arm 230. To drive the cage 211 down to its engaged position, the actuation arm 230 is lifted up from the position shown in FIG. 19 (in which the arm engages the lower face 234 of the slot 233), then rotated until the arm 230 engages face 235 of slot 233. The arm 230 pushes down onto the cage to drive it to the lowered, engaged position. For illustration, the cage 210 (and its associated actuation mechanism) is shown in its engaged position in FIG. 19 and the cage 211 is shown in its unengaged position.

As the roller 247 slides axially down to its engaged position, the correspondingly tapered inner cam surface 236 of the jaw 202 wedges the roller against the pipe string. This secures the pipe string against relative axial movement.

Preferably the internal angle of taper 237 of the cam surface 236 and the roller is greater than 0 degrees and less than 60 degrees. More preferably the internal angle of taper 237 is in the range of 3 to 5 degrees. The angle of the taper is exaggerated in the drawings for purposes of illustration.

The cam surface 236 is formed with a series of V-shaped recesses 238 arranged around the circumference of the bore 239 which receive the rollers, as shown in the plan view of FIG. 20. These recesses act to urge the rollers against the pipe string as described below with reference to FIGS. 28-30. In the non-engaged position of FIG. 28 the rollers 247 are each centered in their respective recesses 238 in the cam surface 236. If a torque is applied to the pipe string (or equivalently if the cages are rotated) the rollers will roll around the pipe string 208. As the rollers move, they are urged by the cam surface towards the pipe string to the position shown in FIG. 29 in which they engage the pipe string. As the rollers continue to move, they are wedged into the pipe string and cause the pipe string to deform as shown in FIG. 30. Such deformation could be measured, for example, by a strain gauge attached to the inner or outer circumference of the pipe string.

However, the pipe string only needs to deform a small amount in order to firmly grip the rollers. Therefore, the pipe casing 208 is not deformed beyond its elastic deformation limit (either during initial gripping or when the pipe casing is being rotated) and when the rollers are released to the non-engaging position of FIG. 28, the pipe casing 208 relaxes back to its undeformed state.

Figure 28:
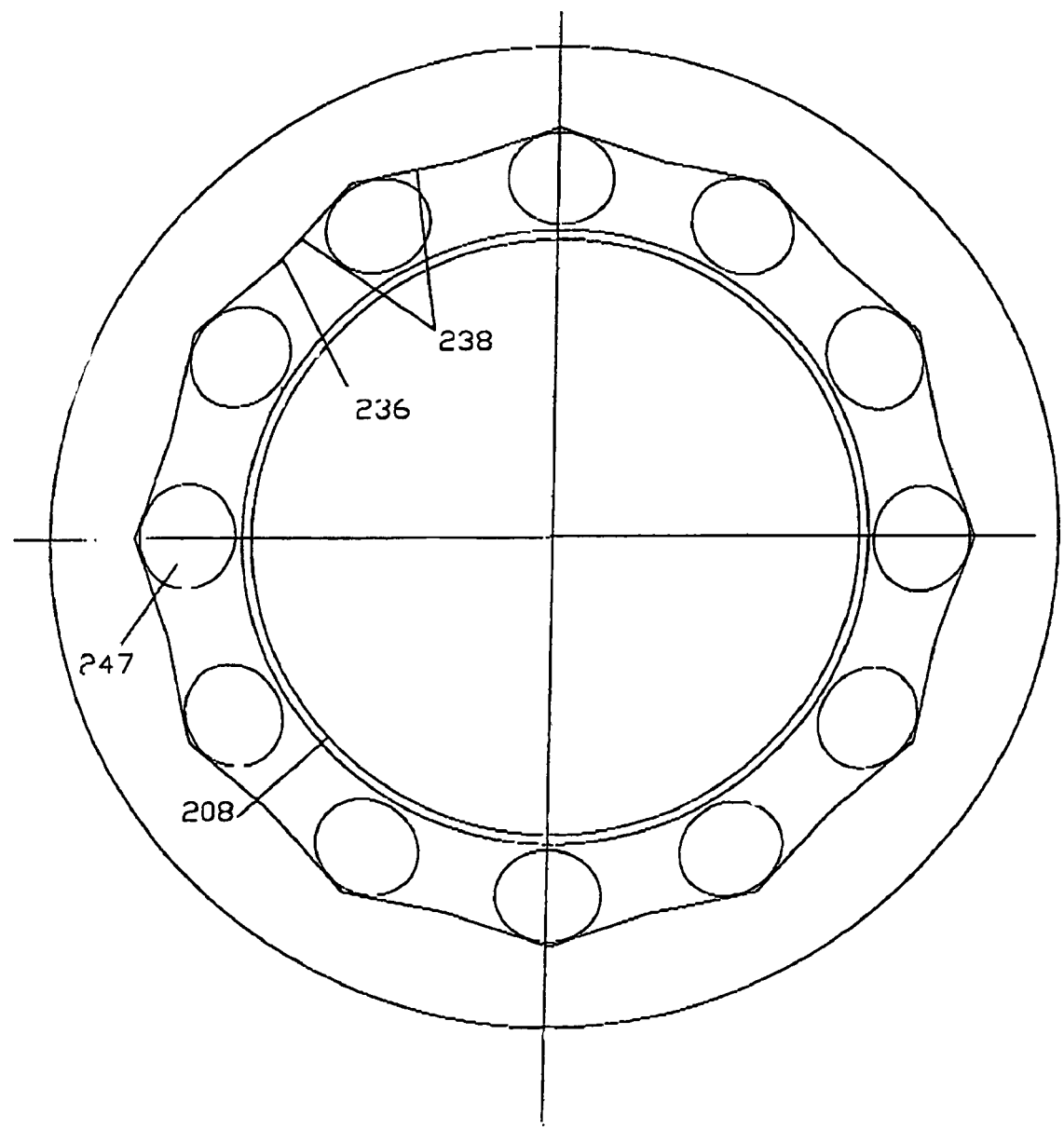
FIG. 28 is a simplified plan view of the mechanism of FIGS. 19-22 showing the rollers in their non-engaged position.
Figure 29:
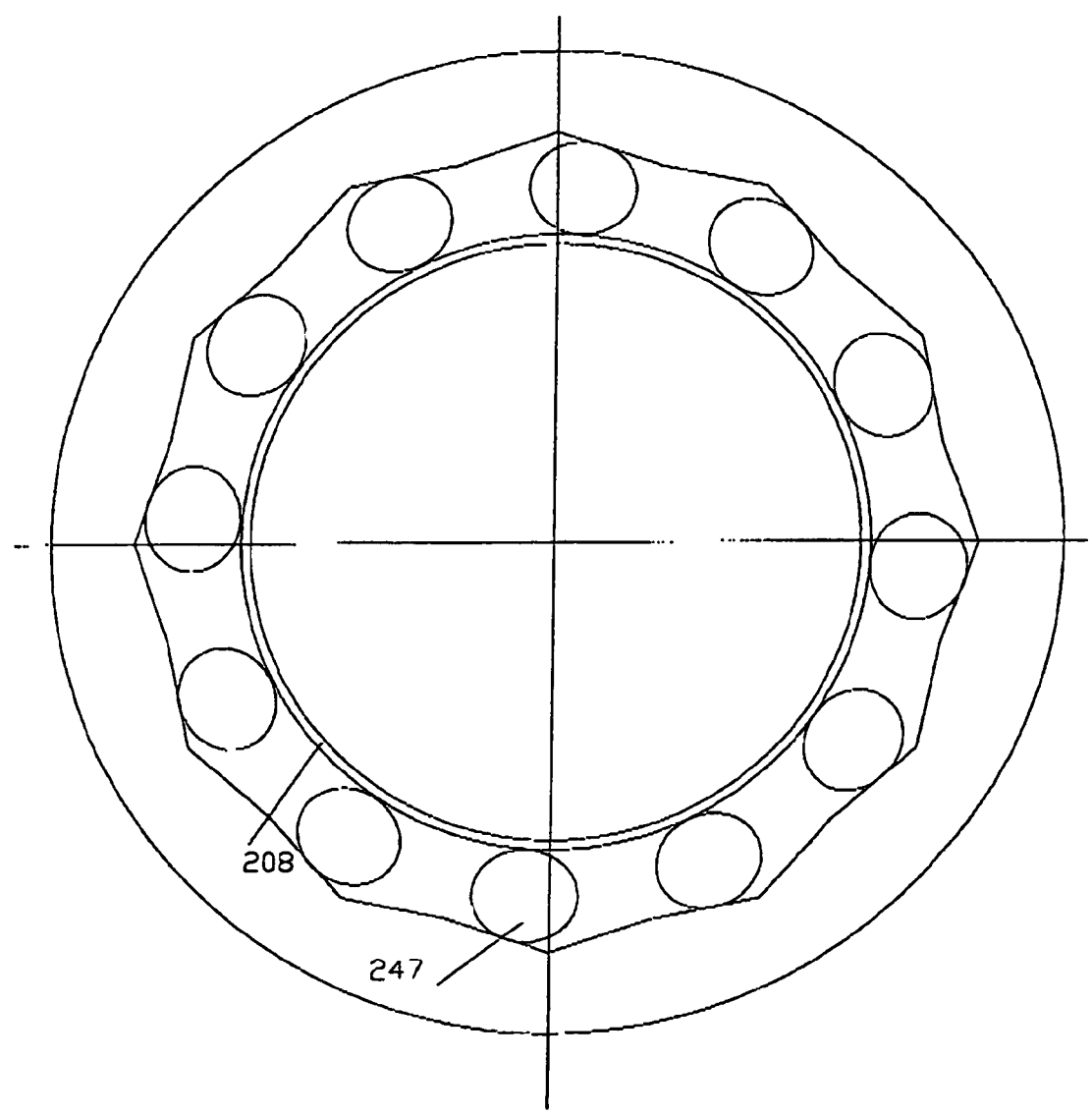
FIG. 29 shows the rollers after they have rolled into a partially engaged position.
Figure 30:
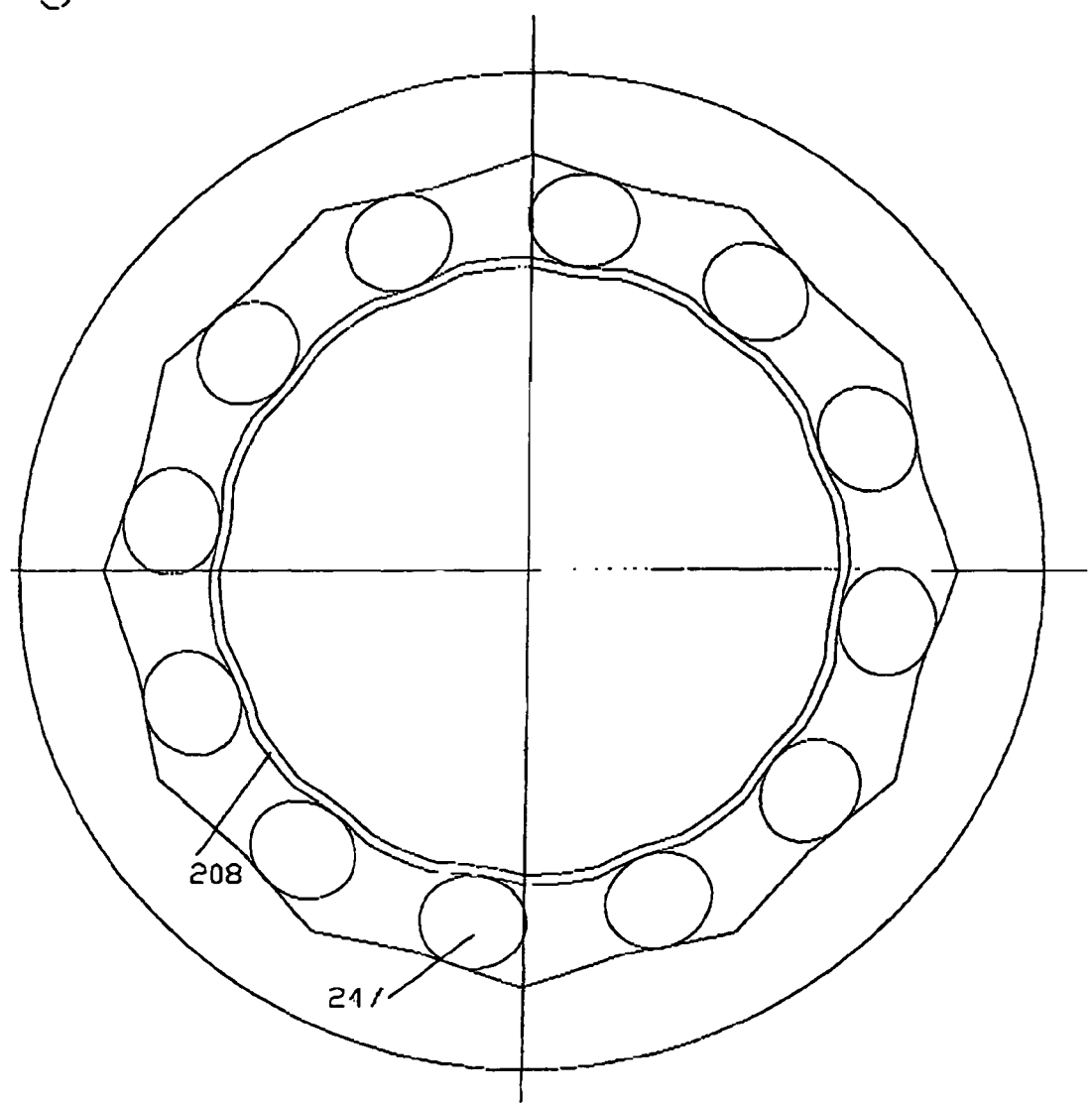
FIG. 30 shows the rollers in their fully engaged position and deforming the pipe string.

It will be appreciated that the range of movement of the rollers 247, and the degree of deformation of the pipe string 208, have both been exaggerated in FIGS. 28-30 for purposes of illustration.

The actuation mechanism shown in FIGS. 19-21 drives the cages downwards to engage the rollers with the pipe string. An advantage of this arrangement is that a wide variety of pipe string diameters can be accommodated by varying the range of movement of the cages.

Figure 22B:
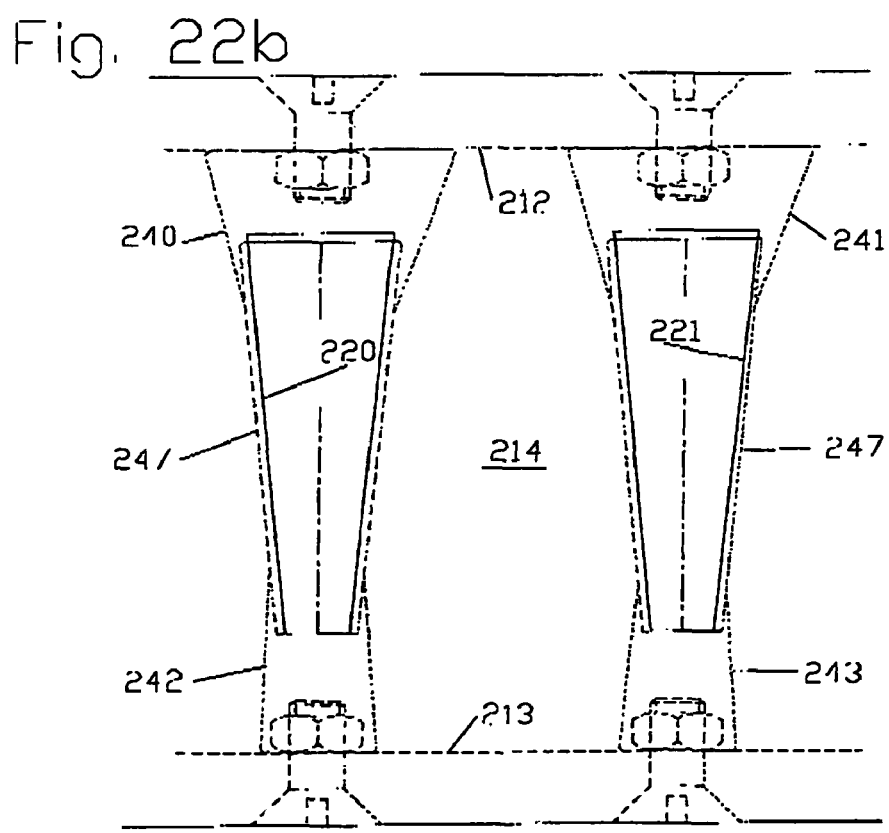
FIG. 22b is a view of an alternative cage.

In an alternative arrangement illustrated in FIG. 22b, the cages are rotated by alternative actuation mechanisms (not shown) to engage the rollers with the pipe string. In this case, the leaf spring 216 is replaced with upper leaf springs 240,241 and lower leaf springs 242,243. The leaf springs 240-243 each have a respective base secured to a cage flange 212/213 and a pair of arms which grip opposite sides of the roller. When the cage is rotated, force is applied to the rollers by the spring arms, causing the rollers to roll round the pipe string.

In a further alternative arrangement, two different actuation mechanisms (not shown) are provided—one to drive the rollers downwards, and another to rotate the rollers. The roller mounting system for such a mechanism is shown in FIG. 22c. Each fastener 215 secures a respective leaf spring 216 to flange 212. Each fastener 215 also secures a second leaf spring having a base and two arms 245,246 which each apply a sideways biasing force to a respective different roller.

Figure 23:
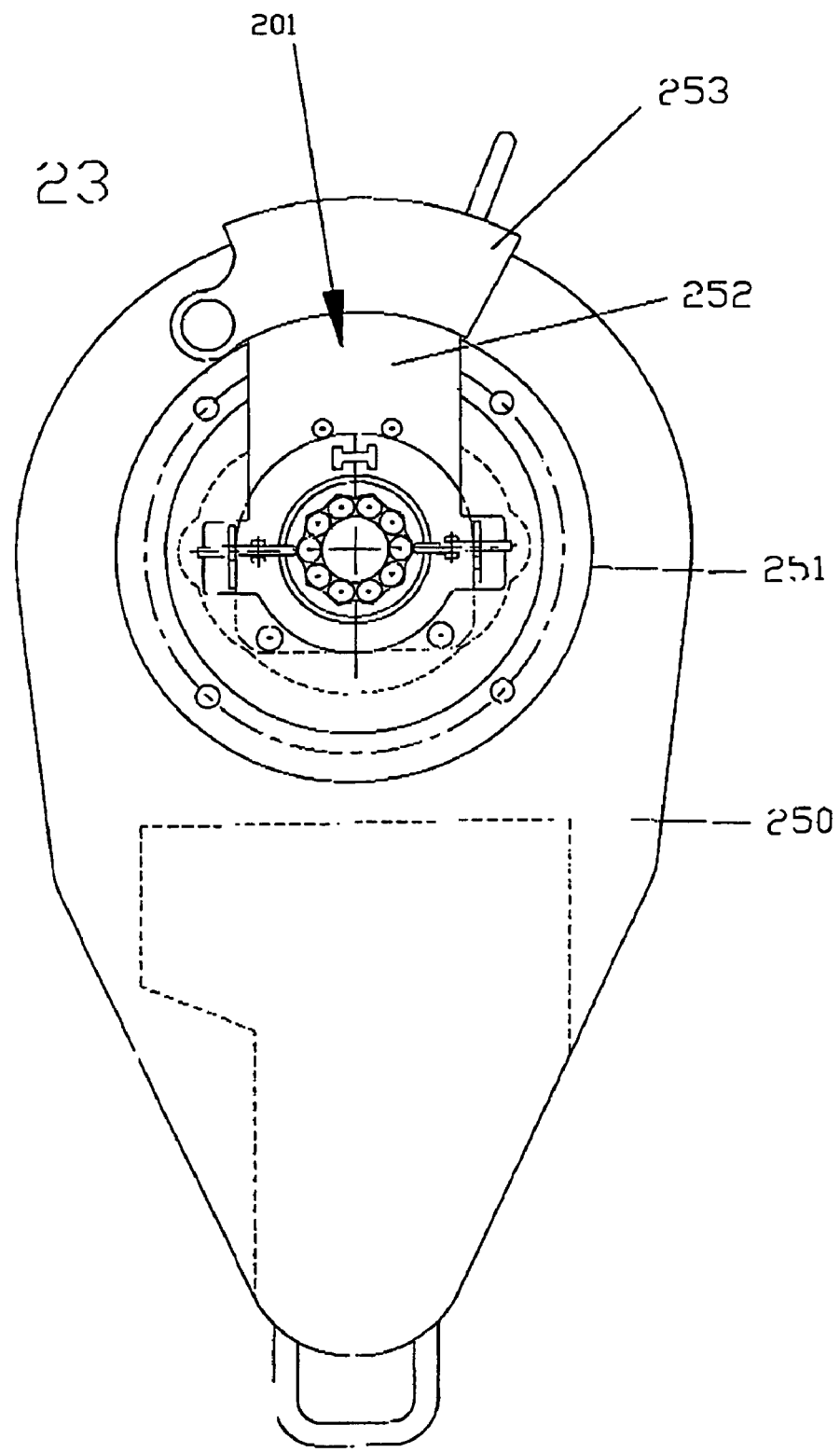
FIG. 23 is a plan view of an oil field tong incorporating the mechanism of FIGS. 19-22.
Figure 23A:
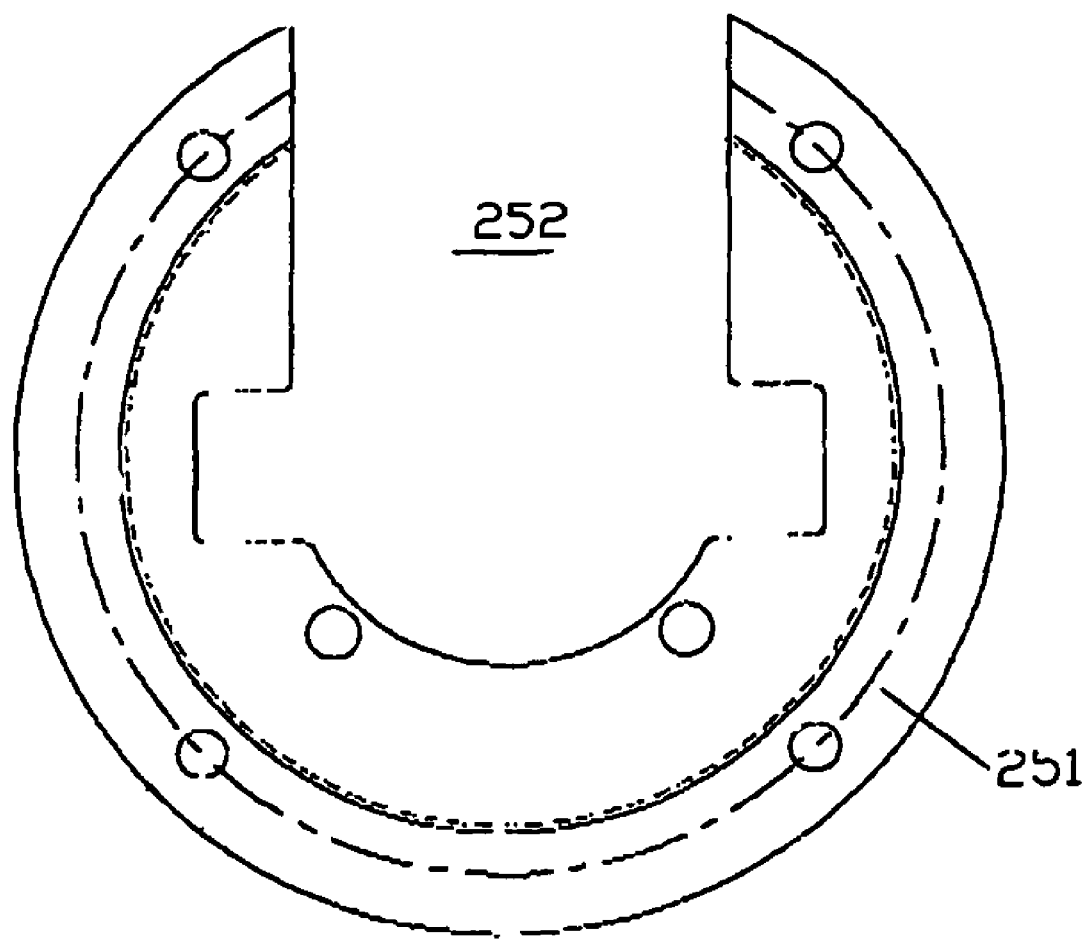
FIG. 23a is a plan view of an adapter plate.
Figure 24:
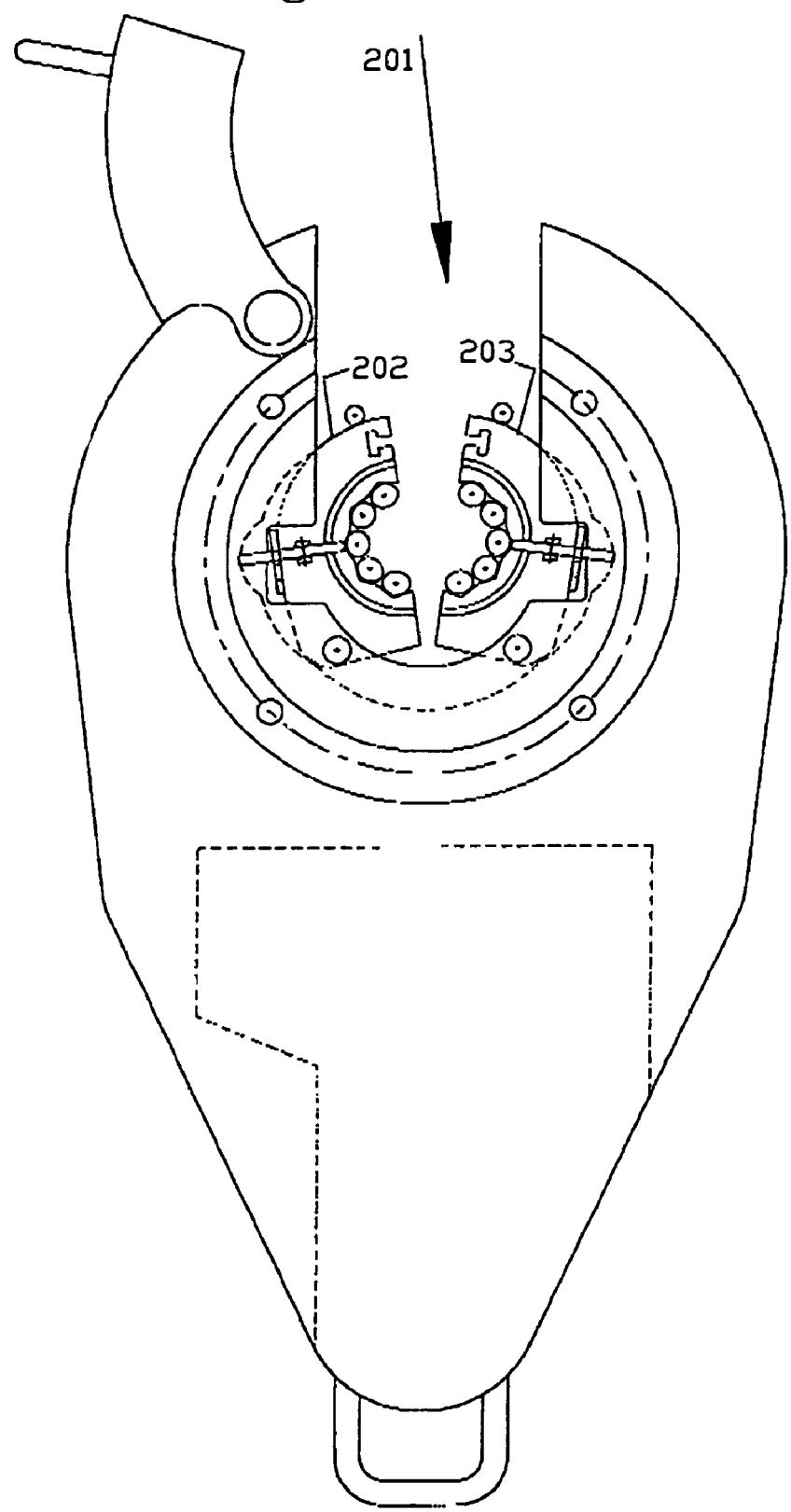
FIG. 24 shows the tong with the gripping jaws open.

Referring to FIGS. 23,23a and 24-the gripping mechanism 201 is mounted, in use, in a tong 250. The mechanism 201 is housed between a pair of adapter plates 251. Pipe string 208 is introduced by opening gate 253 and jaws 202,203 (see FIG. 24) and moving the pipe string 208 laterally into throat 252.

In use, an existing pipe string (not shown) is received in a borehole and axially supported by a slip elevator (not shown). In order to attach an additional length of pipe string 208, the existing pipe string is secured against torque by a set of backup jaws (not shown) and the additional length 208 is gripped by the tong 250 and screwed into the existing pipe string. Large torques are required to ensure a gas tight seal between the coupled lengths of pipe string.

Figure 25:
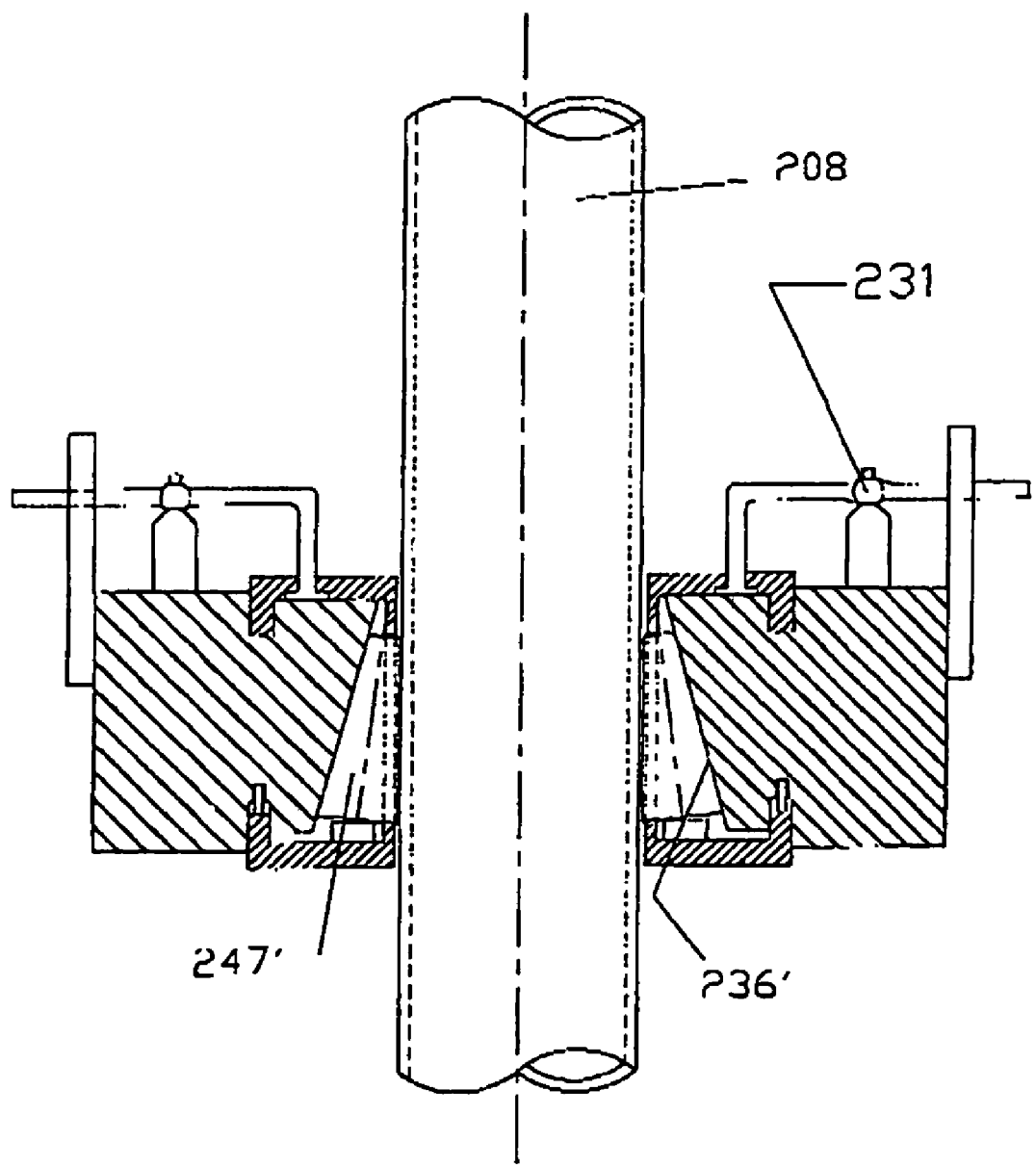
FIG. 25 is a sectional view of an alternative pipe string gripping mechanism with inverted rollers.

It will be appreciated that the mechanism of FIGS. 19-21 can be inverted as shown in FIG. 25. In this case the angle of taper of the rollers 247 and cam surface 236 are reversed, and the cages are pulled upwards by their respective actuation mechanisms.

Figure 26:
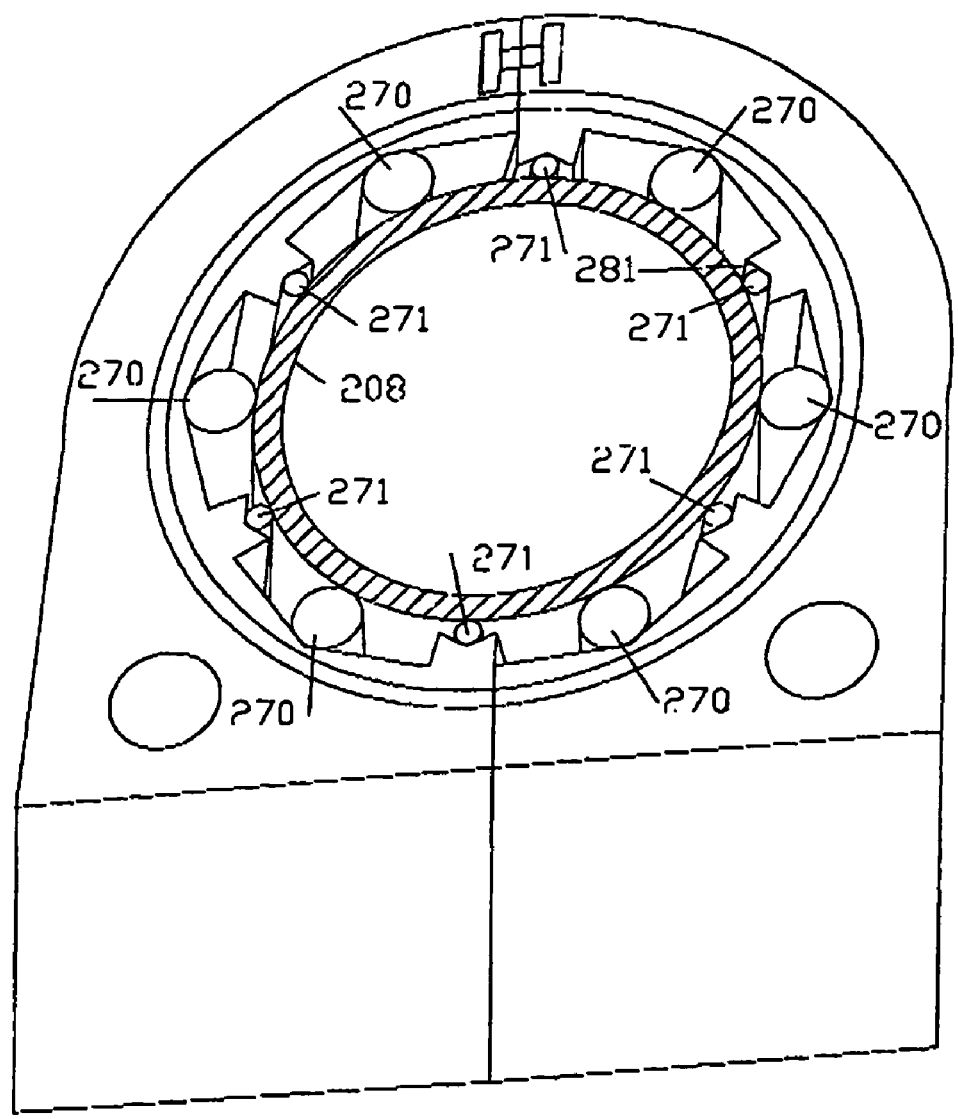
FIG. 26 is a perspective view of an alternative pipe string gripping mechanism with alternating rollers.
Figure 27A:
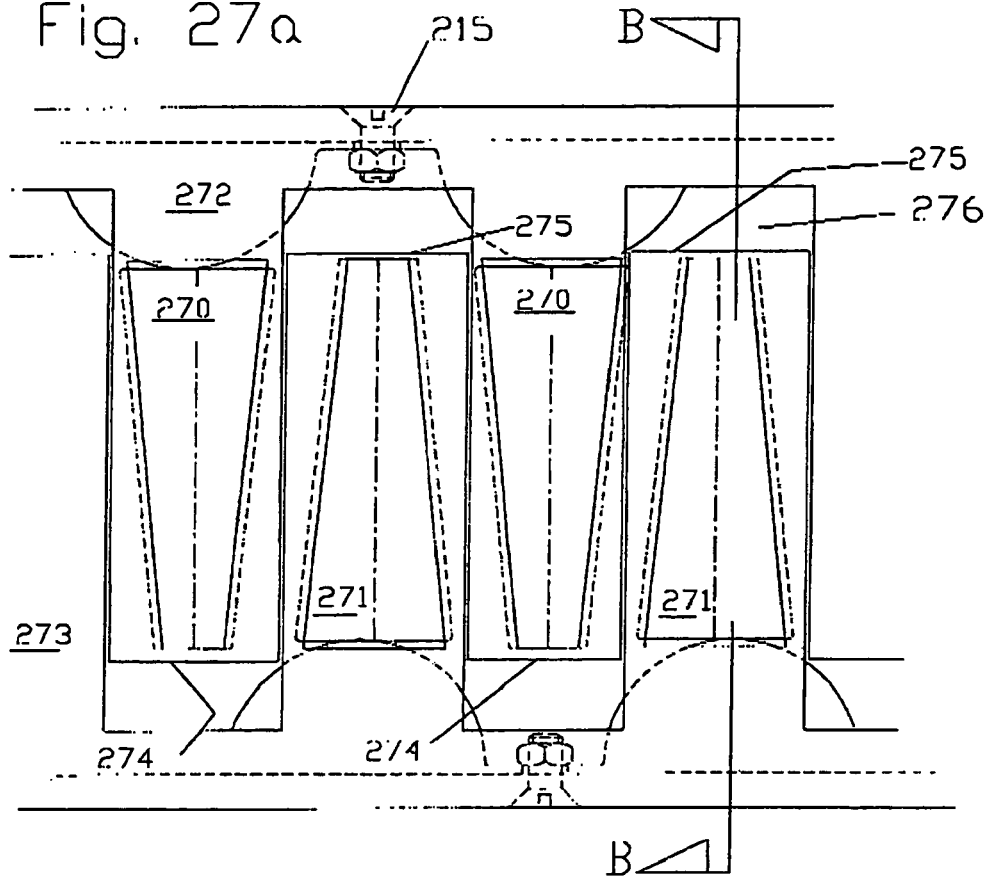
FIG. 27a is a view of the cage as viewed from inside the bore of the mechanism of FIG. 25, with no pipe casing present.
Figure 27B:
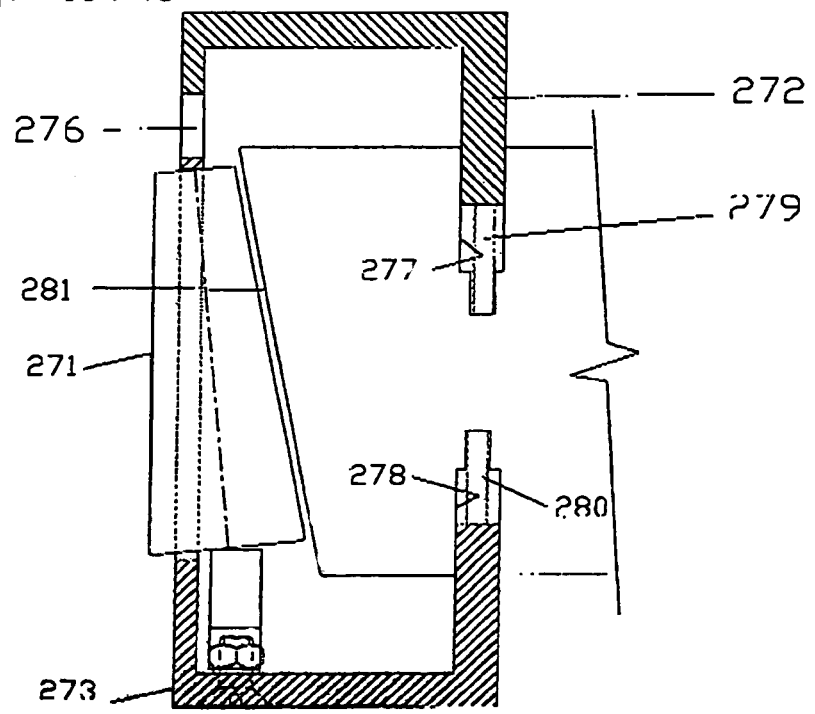

In a further alternative arrangement shown in FIGS. 26, 27a and 27b, the rollers are 'top-and-tailed'. Specifically, there are six downwardly directed rollers 270 which alternate with six upwardly directed rollers 271. Referring to FIGS. 27a and 27b: the downwardly directed rollers 270 are mounted in a first cage 272 and the upwardly directed rollers 271 are mounted in a second cage 273. The cage 272 has a series of downwardly pointed fingers 274 and the cage 273 has a series of upwardly pointed fingers 275 which interlock with the fingers 274. Windows 276 are provided to allow relative axial movement between the two sets of fingers.

Each cage is driven up or down by a respective actuation mechanism (not shown), and is mounted in a respective cage groove 277,278 containing a return spring 279,280, shown in FIG. 27b.

The rollers 271 are urged against the pipe casing by a correspondingly tapered cam surface 281 with a V-shaped recess shown in FIG. 26, and the rollers 270 are urged against the pipe casing by a similar cam surface (not shown).

An advantage of the arrangement of FIGS. 26-27*b* is that the rollers can be more densely packed than in the arrangement of FIG. 19.

Referring to FIGS. 31*a*-31*c*, a socket wrench designated generally at 300 has a handle 301 and a head 302 having a bore defined by a cam surface 303 shown most clearly in FIG. 31*c*. A cage mounted in the bore comprises a cylindrical body portion 306 with a pair of flanges 304,305. The body portion 306 has eight tapered windows which each receive a respective tapered roller 307.

A generally cylindrical socket member 308 is formed with a large hexagonal socket 309 on one side and a small hexagonal socket 310 on the other side. The member 308 has a series of holes arranged around its periphery each housing a coil spring and indent ball 311,312.

The rollers 307 can be engaged with the member 308 in two ways. In one alternative, by pushing the member 308 with the thumb in a direction indicated by arrow A (while holding the handle 301 still), the member 308 moves the indent ball 311 which engages the cage flange 304. The cage then engages the rollers 307 and slides them along cam surface 312. The cam surface 312 forces the rollers against the member 308 to lock the member 308 in place. A nut can then be received in either of the sockets 309,310 and rotated by rotating the handle 301 in either direction. The rollers can be disengaged by pushing the member 308 in the opposite direction to arrow A with the thumb.

In a second alternative, the rollers can be engaged by rotating the cage with an actuating handle 313. The handle 313 can be moved to the left or right (as viewed in FIG. 31*a*). The cam surface 303 is formed with V-shaped recesses shown in FIG. 31*a* which urge the rollers 307 against the member 308 when the cage is rotated.

Figure 32:
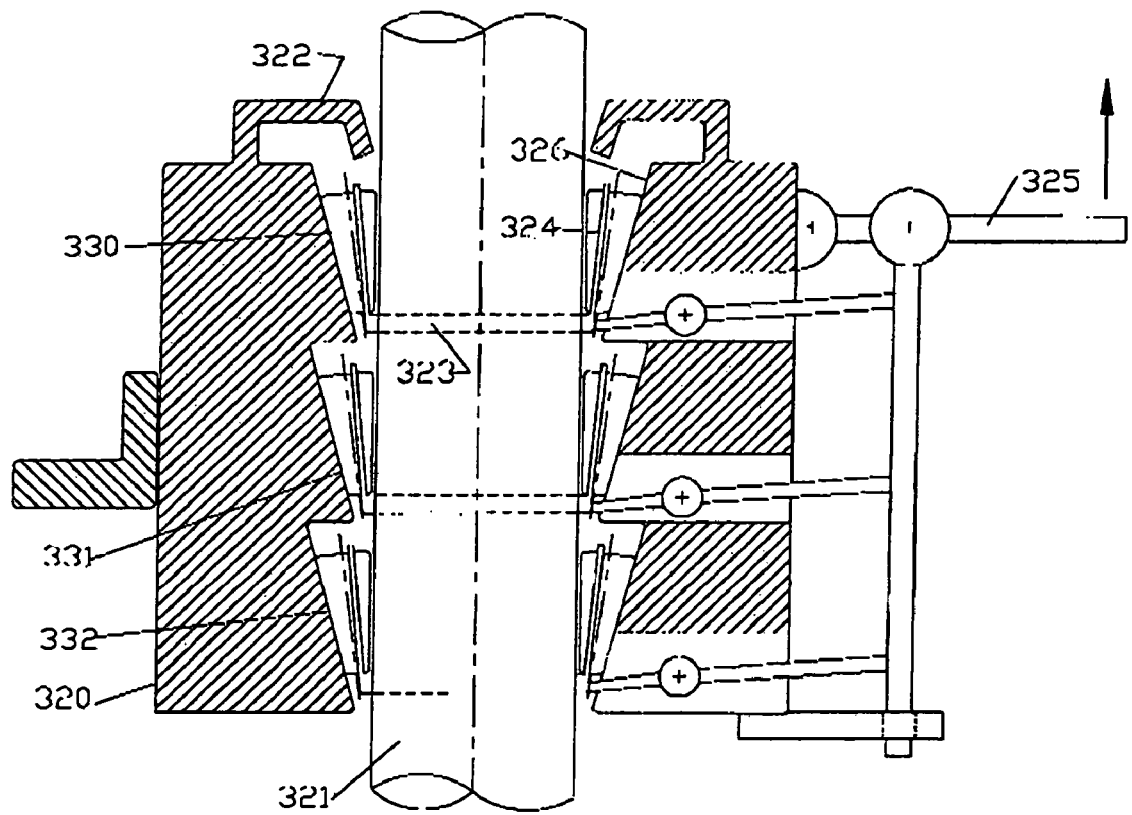
FIG. 32 is a cross-sectional side view of a slip-type elevator.

A slip type elevator is shown in FIGS. 32 and 33. The elevator has a generally cylindrical body portion 320 which is formed as a single piece, and is not split and hinged as in the tong mechanism shown in FIGS. 19-26. The body portion has a bore which receives a pipe string 321. The pipe string 321 is gripped by thirty rollers, arranged as three layers of ten rollers. The upper layer of ten rollers 330 is shown in the plan view of FIG. 33. Two rollers in each layer 330,331,332 are shown in the sectional view of FIG. 32.

The upper layer of rollers 330 is confined by a guide 322 shown in FIG. 32 but omitted from FIG. 33 for clarity. Each layer of rollers is supported by a respective cage comprising a circular ring 323 and flange 324 which is formed with a series of tapered slots (not shown) which receive the rollers. The three cages are each coupled to a handle 325. When the handle 325 is lifted up, the cages are lowered which allows the rollers to drop due to gravity. As the rollers slide down they are forced by respective cam surfaces 326 against the pipe string 321. The weight of the pipe string 321 can then be supported by the rollers. The weight forces are transferred to the body portion 320 which is attached to a rig floor (not shown) by three supports 327,328,329 shown in FIG. 33. In an alternative arrangement (not shown) the weight forces may be transferred to bails by lugs.

If the pipe string 321 is rotated, the rollers roll up their V-shaped recesses in the cam surface (shown in FIG. 33) and are forced against the pipe string, thus resisting the rotational movement.

The mechanism shown in FIGS. 19-30 (with a single row of rollers) is able to transfer axial load and torque. However, the ability to transfer axial load is increased when torque is also present. Where the mechanism is employed in a slip elevator, then torque may not be present. This is why multiple rows of rollers are present in the embodiment of FIGS. 32,33: to provide increased ability to resist axial loads in the absence of torque, whilst not deforming the pipe casing beyond its elastic deformation limit. Although only three rows of rollers are shown in FIG. 32, a larger number of rows (for instance fifteen) may be employed if necessary.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope of the invention as defined in the appended claims.

The invention claimed is:

1. A jaw assembly for gripping a wellbore tubular, the jaw assembly comprising:
   a plurality of gripping members each having a substantially circular cross-section;
   a gripping member support structure including a plurality of gripping member retainer recesses spaced apart along a longitudinal axis of the gripping member support structure, wherein each retainer recess includes a first ramp surface and a second ramp surface that are oblique relative to the longitudinal axis of the gripping member support structure and wherein each retainer recess is configured to hold at least one gripping member, and the at least one gripping member is capable of moving along the ramp surfaces, and
   a lever movable between a first position, a second position and a third position, wherein
   the lever in the first position causes the at least one gripping member to engage a portion of the first ramp surface, and as a result of the engagement, the wellbore tubular is prevented from moving relative to the jaw assembly in a first direction;
   the lever in the second position causes the at least one gripping member to engage a portion of the second ramp surface, and as a result of the engagement, the wellbore tubular is prevented from moving relative to the jaw assembly in a second direction;
   the lever in the third position causes the at least one gripping member to be positioned between the ramp surfaces which allows the wellbore tubular free movement relative to the jaw assembly.

2. The jaw assembly of claim 1, wherein the jaw assembly is a slip.

3. The jaw assembly of claim 2, wherein the gripping prevents axial relative movement of the tubular.

4. The jaw assembly of claim 2, wherein the lever is pivotally attached to the gripping member support structure.

5. The jaw assembly of claim 4, wherein the lever selectively controls the capability of the wellbore tubular to move relative to the slip.

6. The jaw assembly of claim 1, wherein the gripping members are operable to grip the wellbore tubular axially.

7. A jaw assembly for gripping a wellbore tubular, the jaw assembly comprising:
   a plurality of gripping members;
   a gripping member support structure including a first retainer recess at a first position along a longitudinal axis of the support structure and a second retainer recess at a second different position along the longitudinal axis of the support structure, wherein each retainer recess includes a first ramp surface and a second ramp surface and each retainer recess is configured to receive at least one gripping member; and a lever operatively attached to the plurality of gripping members, wherein the lever in a first position causes the at least one gripping member to engage the first ramp surface which results in the wellbore tubular being prevented from moving relative to the jaw assembly in a first direction;

the lever in a second position causes the at least one gripping member to engage the second ramp surface which results in the wellbore tubular being prevented from moving relative to the jaw assembly in a second direction;

the lever in a third position causes the at least one gripping member to be positioned between the ramp surfaces which results in the wellbore tubular being allowed free movement relative to the jaw assembly.

8. The jaw assembly of claim 7, wherein the jaw assembly is a slip and the lever selectively controls the capability of the wellbore tubular to move relative to the slip.

9. A gripping device, comprising:

a plurality of gripping members each having a substantially circular cross-section;

a gripping member support structure including a first retainer recess at a first position along a longitudinal axis of the support structure and a second retainer recess at a second different position along the longitudinal axis of the support structure, wherein each retainer recess includes a first ramp surface and a second ramp surface that are inclined at substantially the same angle relative to the longitudinal axis of the support structure and wherein each retainer recess is configured to receive at least one gripping member and wherein a cage is disposed adjacent to the gripping member support structure and moveable relative thereto, an actuator operatively coupled to at least one of the gripping member support structure and the cage, wherein the actuator in a first position causes the at least one gripping member to engage a portion of the first ramp surface which results in the wellbore tubular being prevented from moving relative to the gripping device in a first direction;

the actuator in a second position causes the at least one gripping member to engage a portion of the second ramp surface which results in the wellbore tubular being prevented from moving relative to the gripping device in a second direction;

the actuator in a third position causes the at least one gripping member to be positioned between the ramp surfaces which results in the wellbore tubular being allowed free movement relative to the gripping device.

10. A jaw assembly for gripping a wellbore tubular, the jaw assembly comprising:

a plurality of gripping members;

a gripping member support structure including a plurality of gripping member retainer recesses in an inner surface thereof, wherein each retainer recess includes two ramp surfaces;

a cage disposed adjacent to the gripping member support structure and moveable relative thereto, the cage configured to interconnect the gripping members and move the gripping members relative to the gripping member support structure; and an actuator configured to move the cage between an upper position, a middle position and a lower position, wherein the cage in the upper position causes the at least one gripping member in the respective retainer recess to engage a portion of one ramp surface which restricts the movement of the wellbore tubular relative to the jaw assembly in a first direction, the cage in the lower position causes the at least one gripping member in the respective retainer recess to engage a portion of the other ramp surface which restricts the movement of the wellbore tubular from moving relative to the jaw assembly in a second opposite direction, and the cage in the middle position causes the at least one gripping member in the respective retainer recess to be positioned between the first and second ramp surfaces which allows movement of the wellbore tubular relative to the jaw assembly in either direction.

11. The jaw assembly of claim 10, wherein the plurality of gripping member retainer recesses comprises at least two substantially parallel rows spaced apart along a longitudinal axis of the gripping member support structure.

12. The jaw assembly of claim 11, wherein the two ramp surfaces are oblique relative to the longitudinal axis of the gripping member support structure.

* * * * *